Feb. 28, 1967 W. H. WENTLING ET AL 3,305,912
CENTRIFUGAL FAN MANUFACTURING
Original Filed Aug. 9, 1962 16 Sheets-Sheet 1

INVENTORS
WILLIAM H. WENTLING &
WILLIAM P. POWELL
BY
*Marechal, Biebel, French & Bugg*
ATTORNEYS

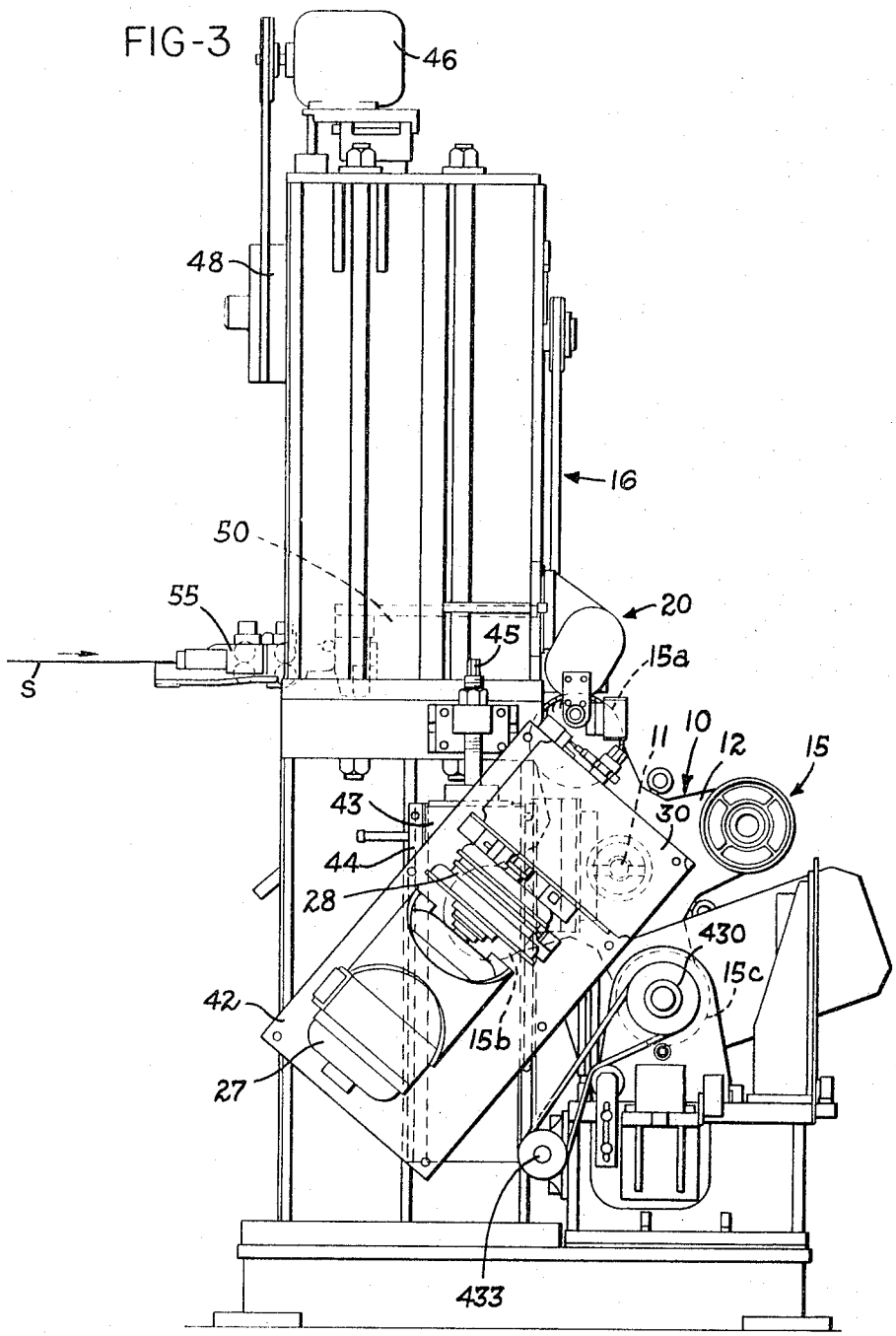

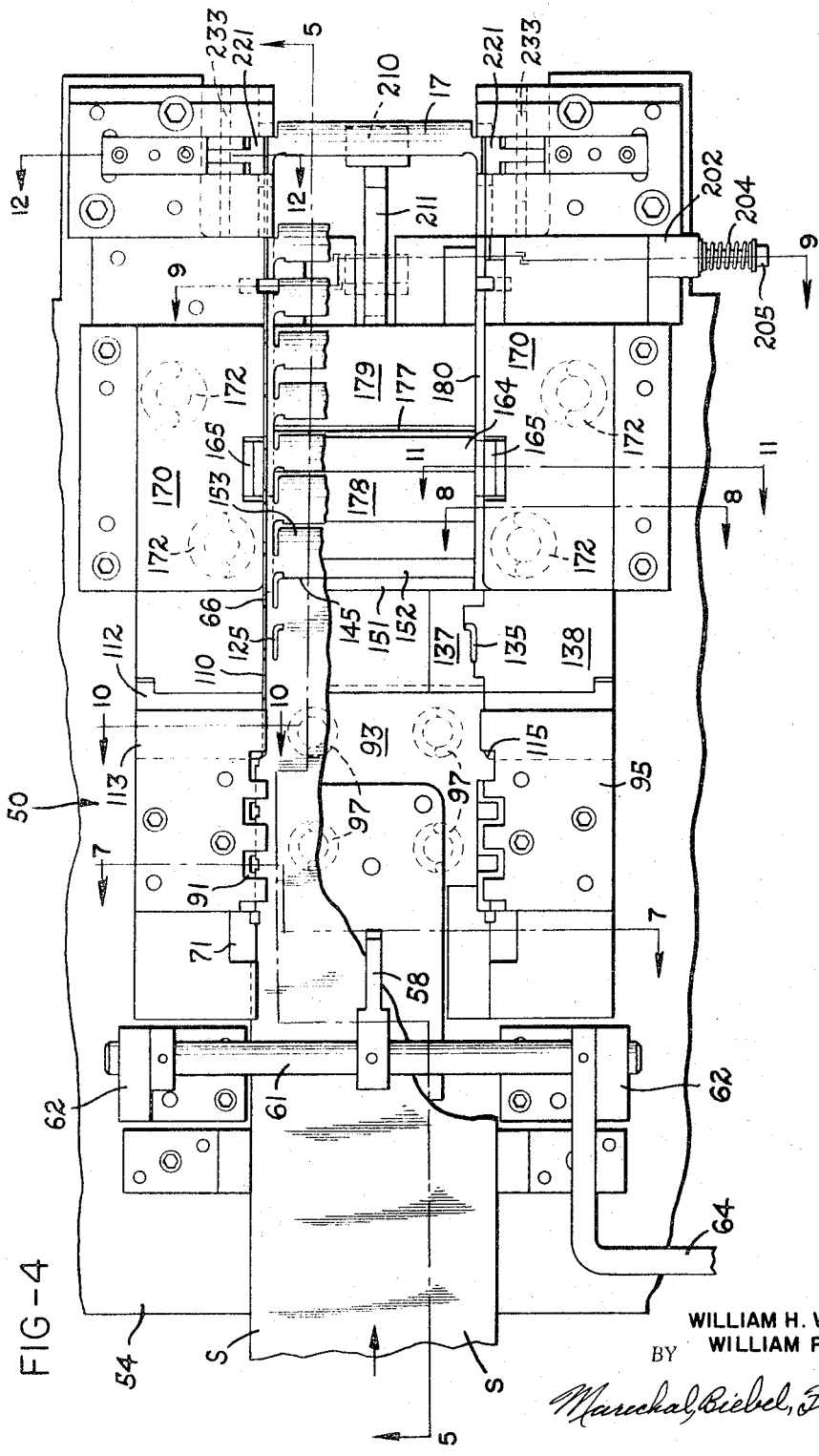

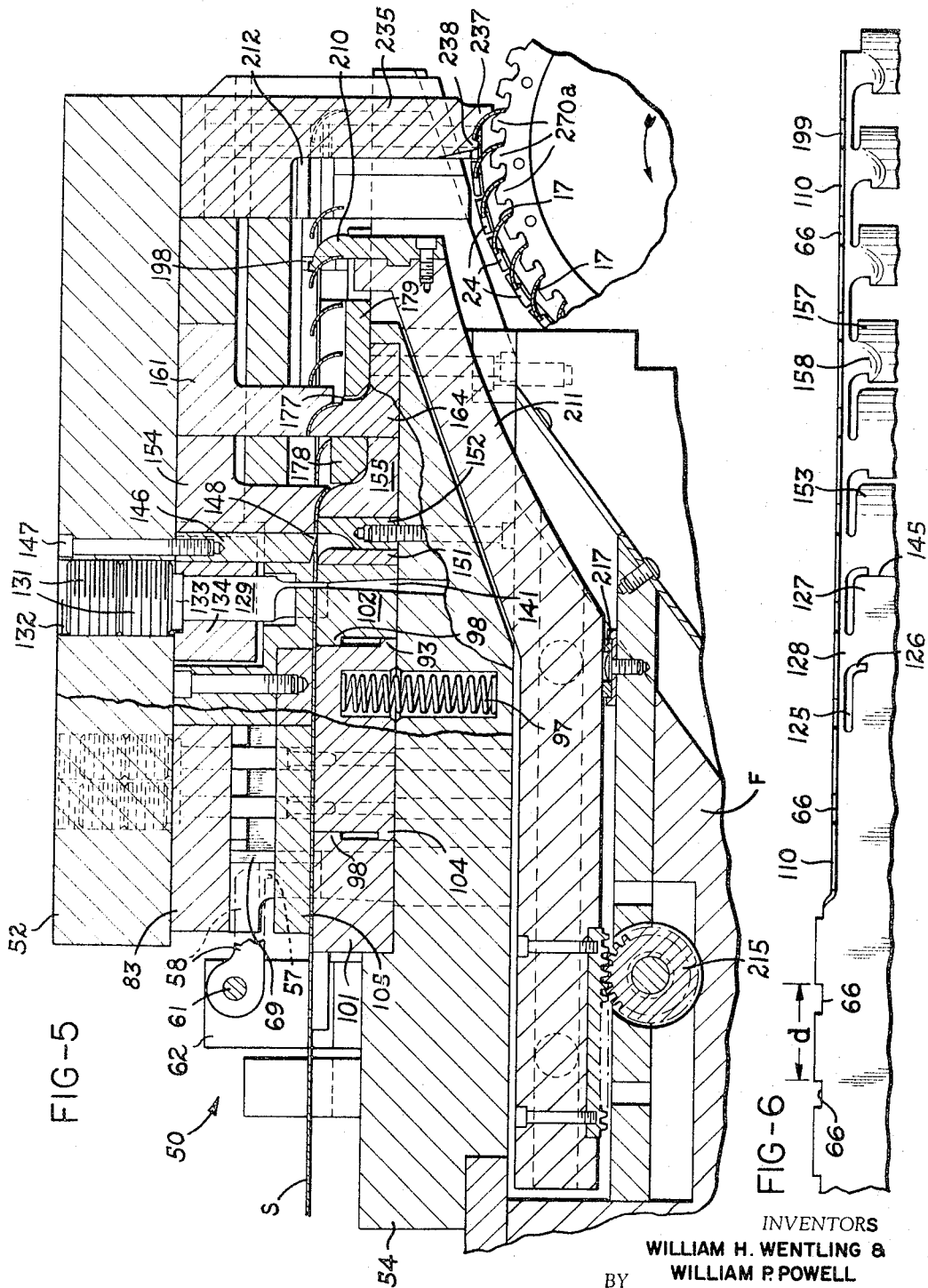

Feb. 28, 1967 W. H. WENTLING ET AL 3,305,912
CENTRIFUGAL FAN MANUFACTURING
Original Filed Aug. 9, 1962 16 Sheets-Sheet 5
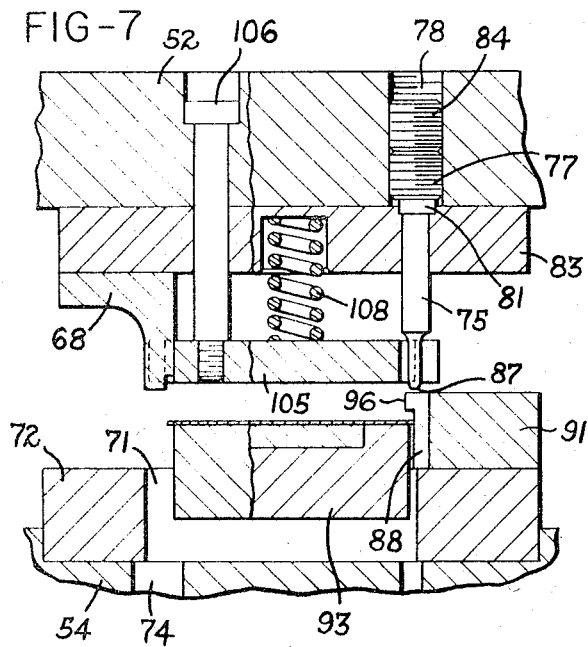
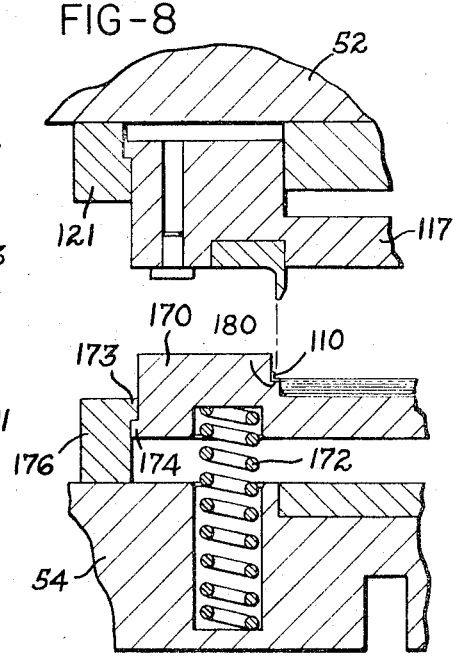
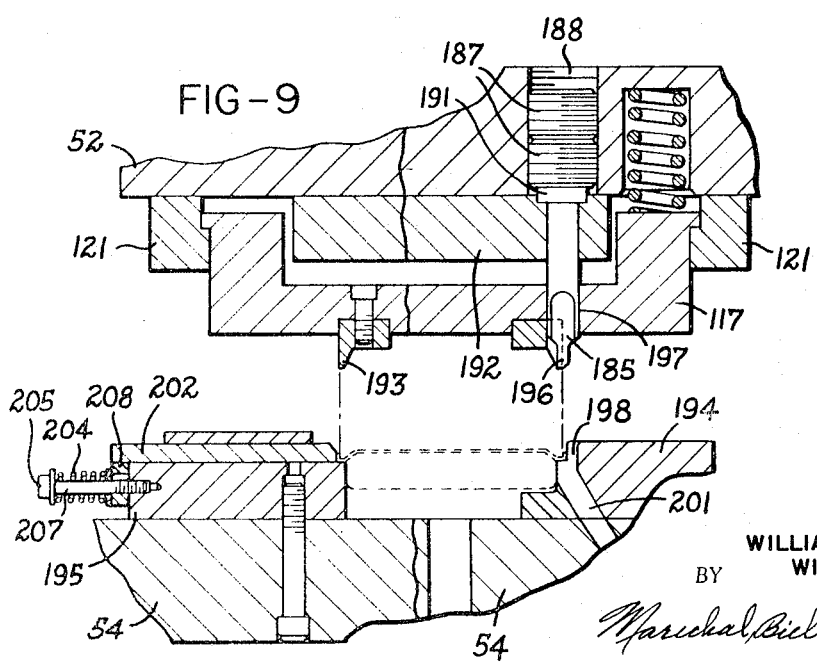
INVENTORS
WILLIAM H. WENTLING &
WILLIAM P. POWELL
BY
*Marshal, Biebel, French y Bugg*
ATTORNEYS

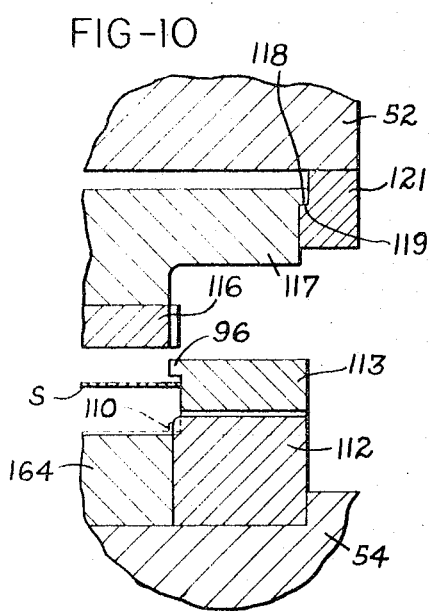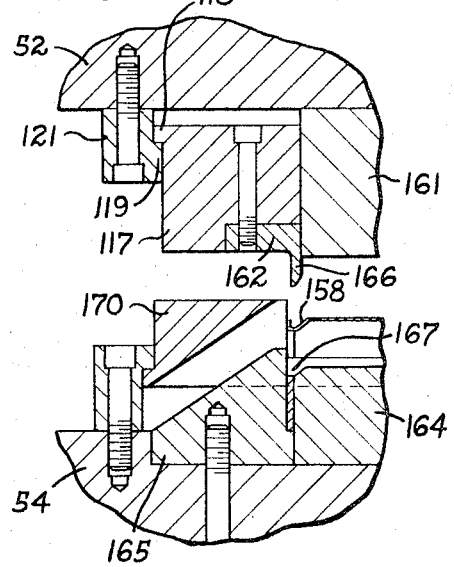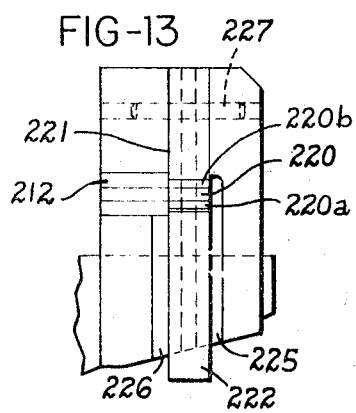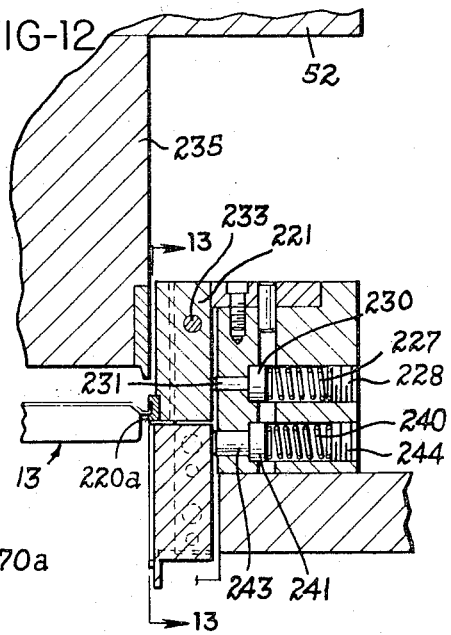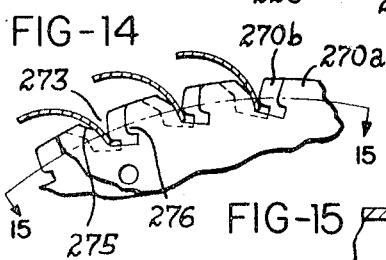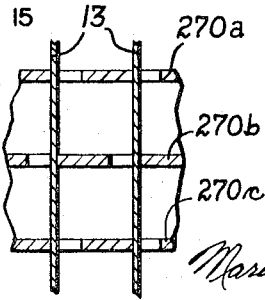
INVENTORS
WILLIAM H. WENTLING &
WILLIAM P. POWELL
BY
ATTORNEYS

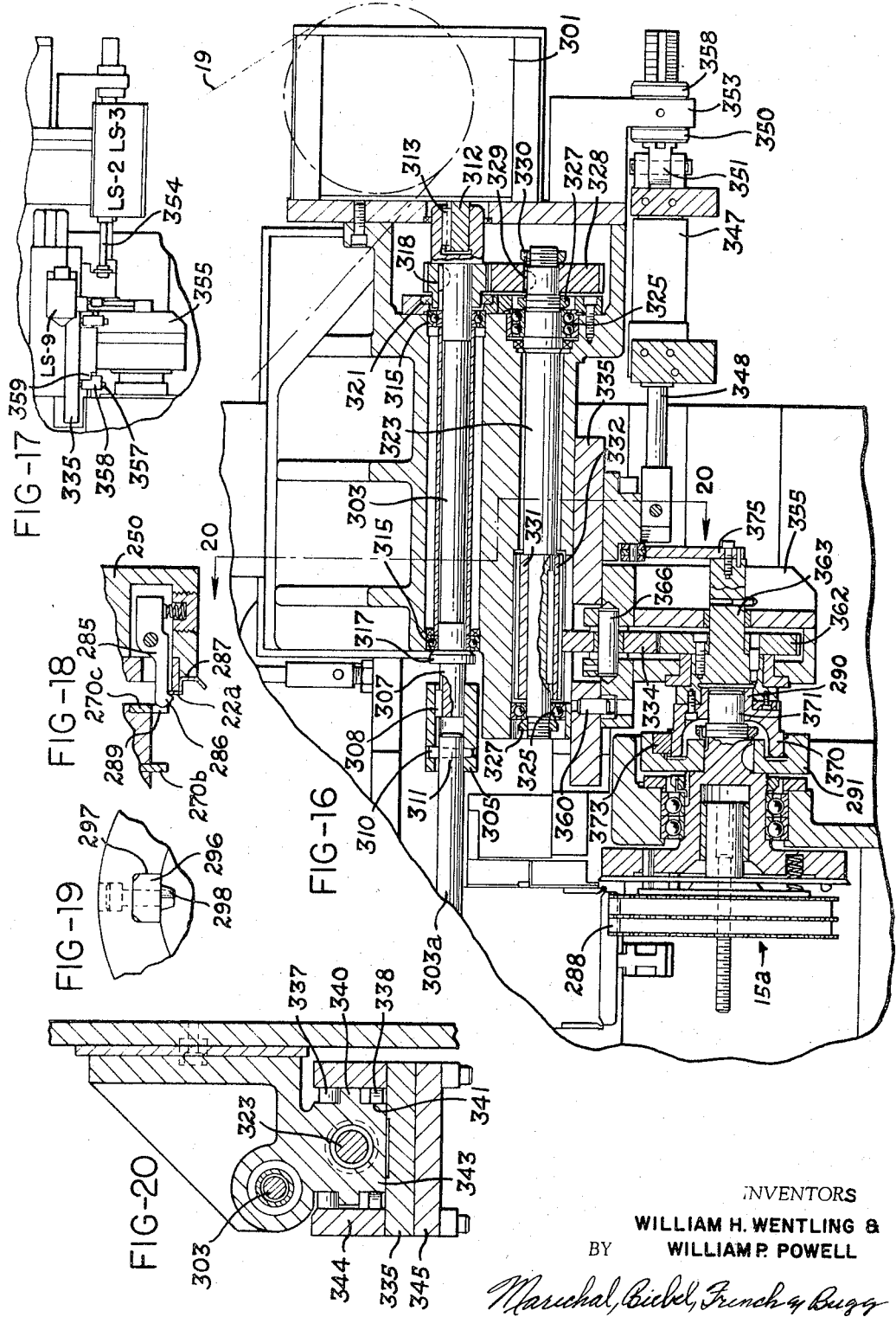

Feb. 28, 1967   W. H. WENTLING ET AL   3,305,912
CENTRIFUGAL FAN MANUFACTURING
Original Filed Aug. 9, 1962   16 Sheets-Sheet 8
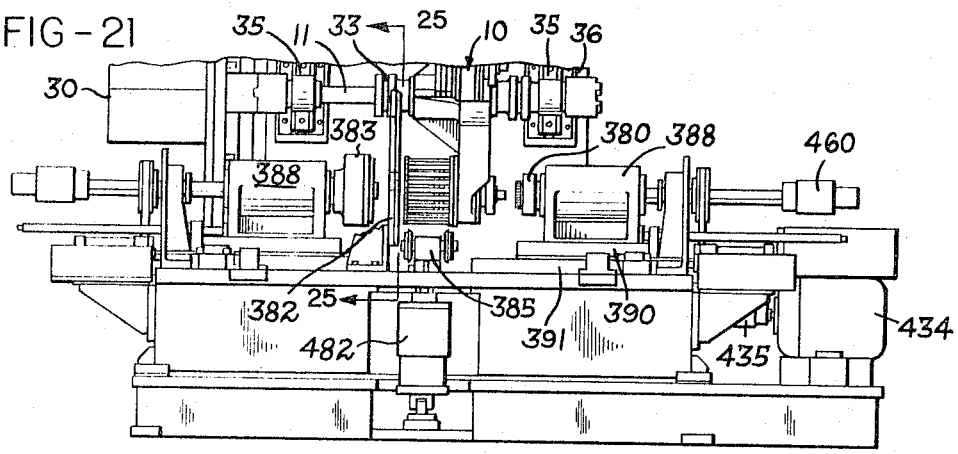
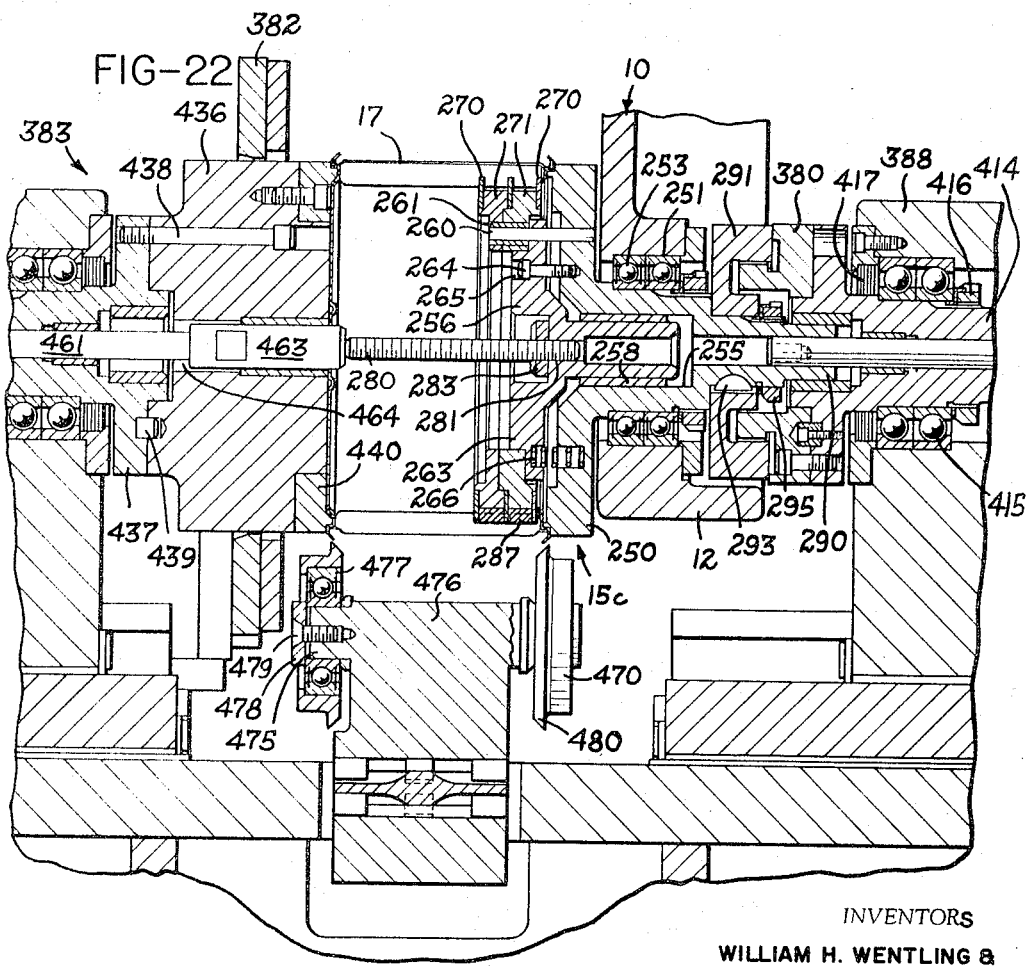
INVENTORS
WILLIAM H. WENTLING &
BY  WILLIAM P. POWELL
Marechal, Biebel, French & Bugg
ATTORNEYS INVENTORS
WILLIAM H. WENTLING &
WILLIAM P. POWELL
BY
*Marshal, Biebel, French & Bugg*
ATTORNEYS

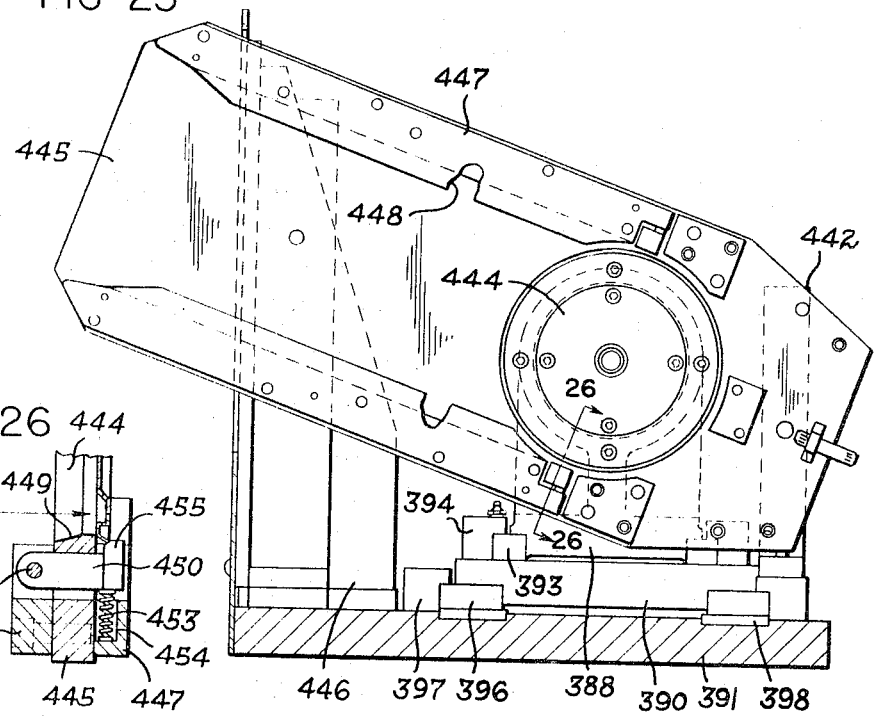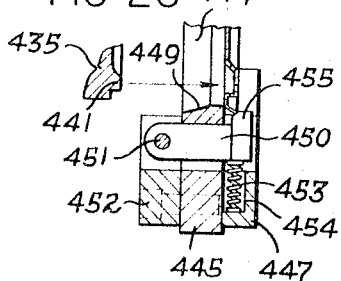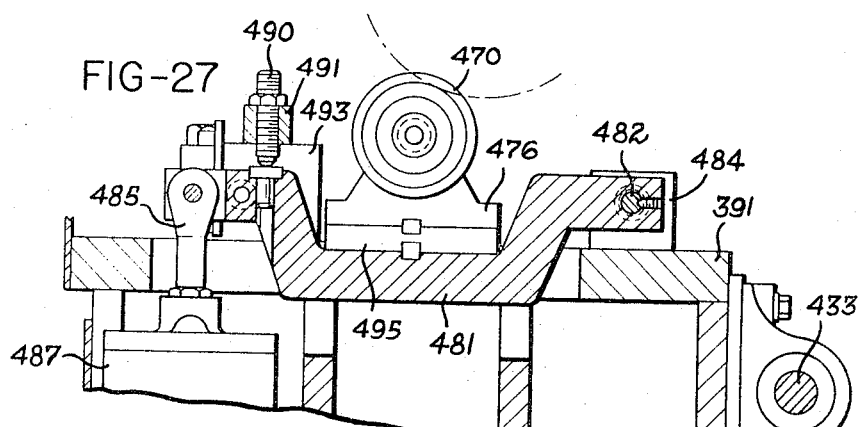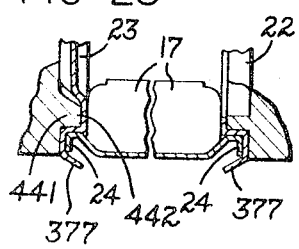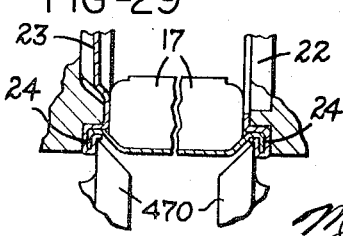

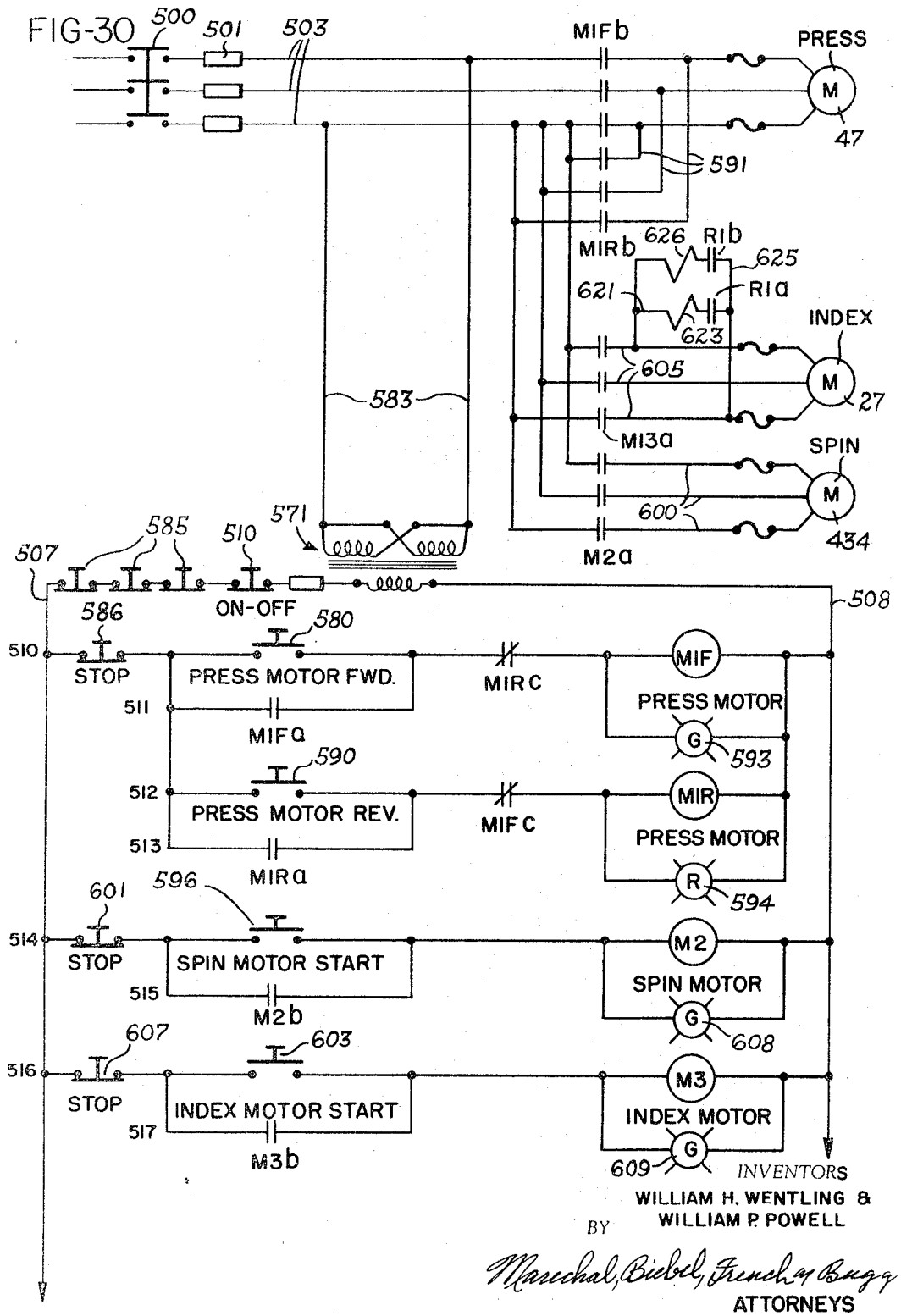

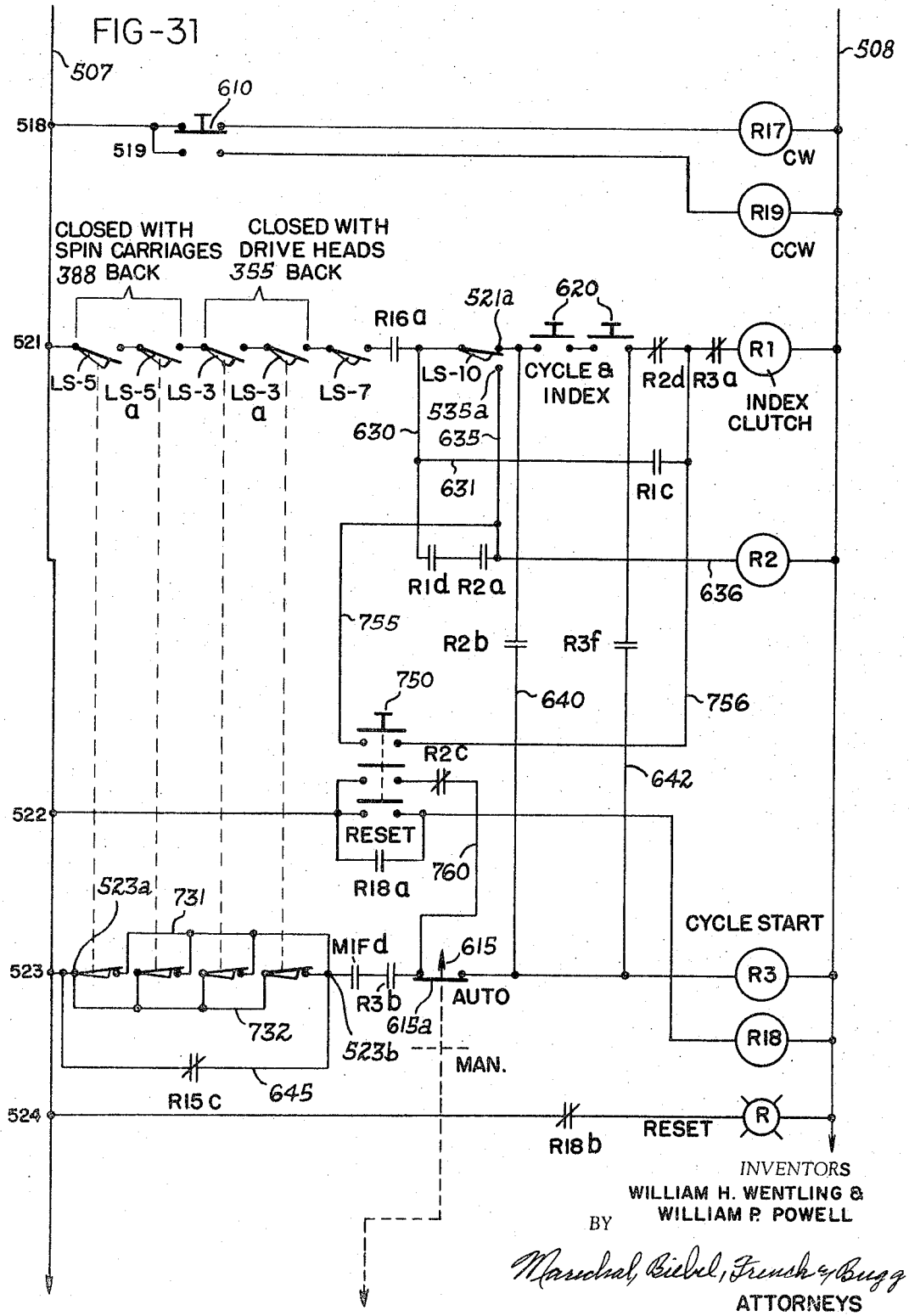

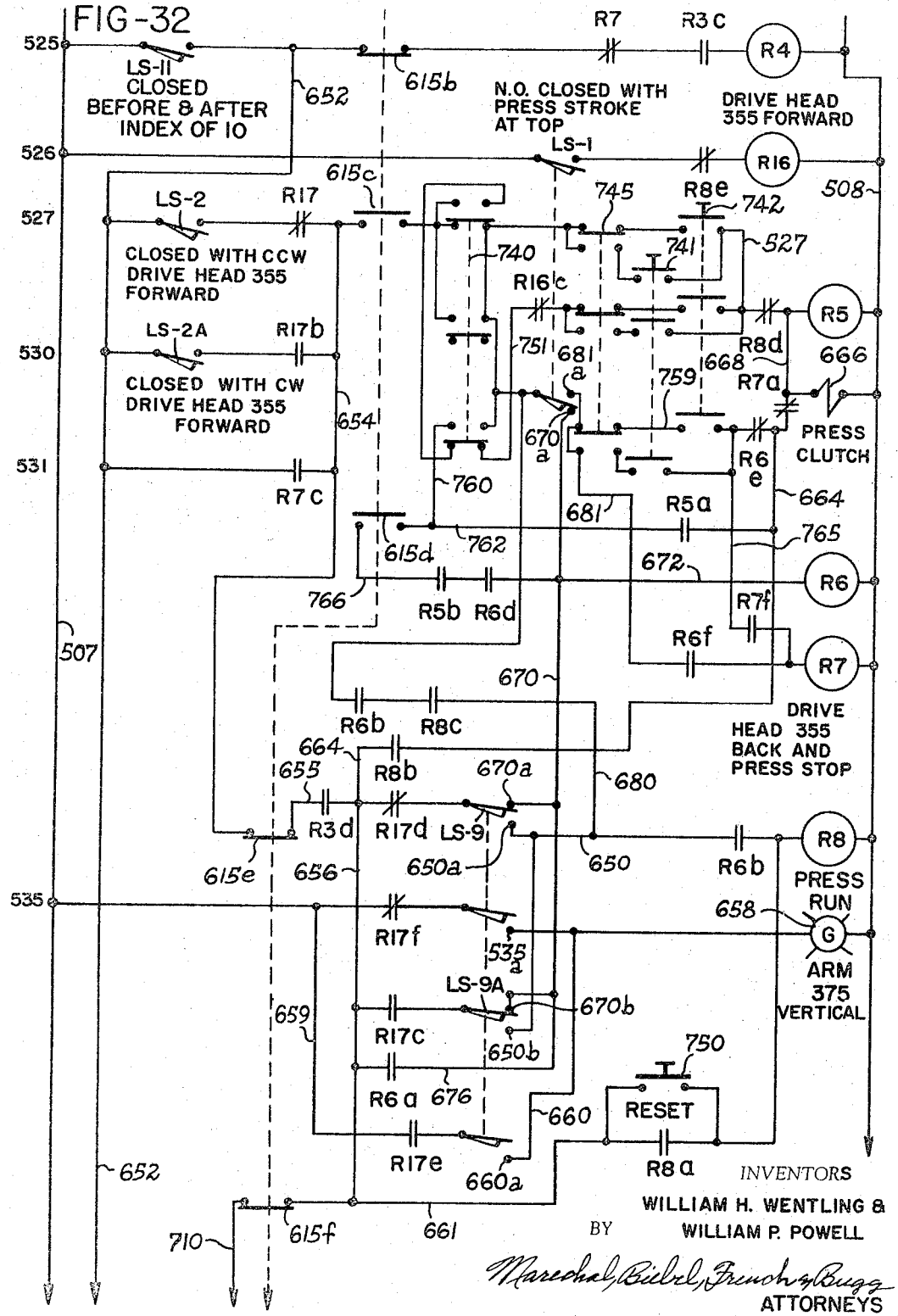

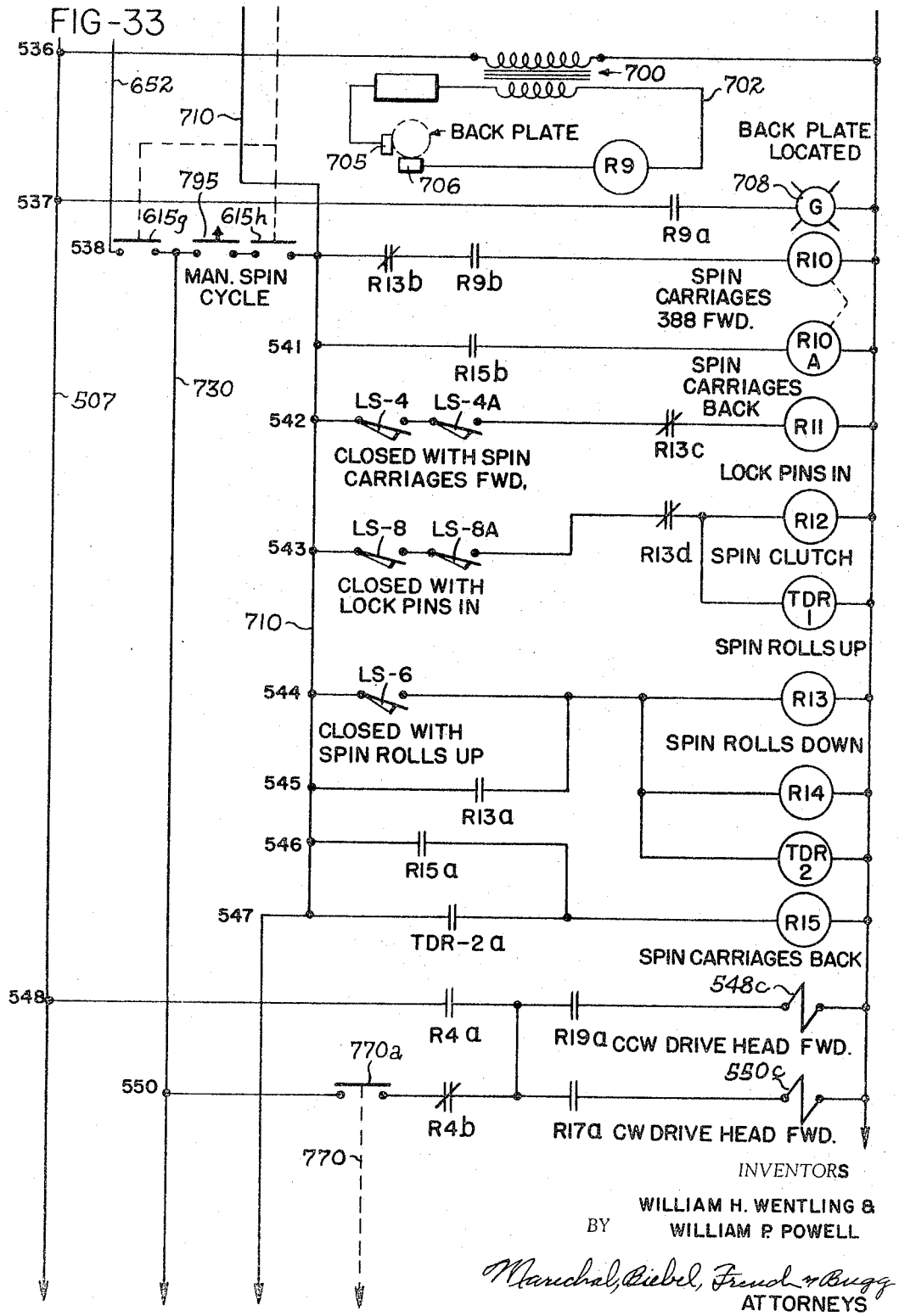

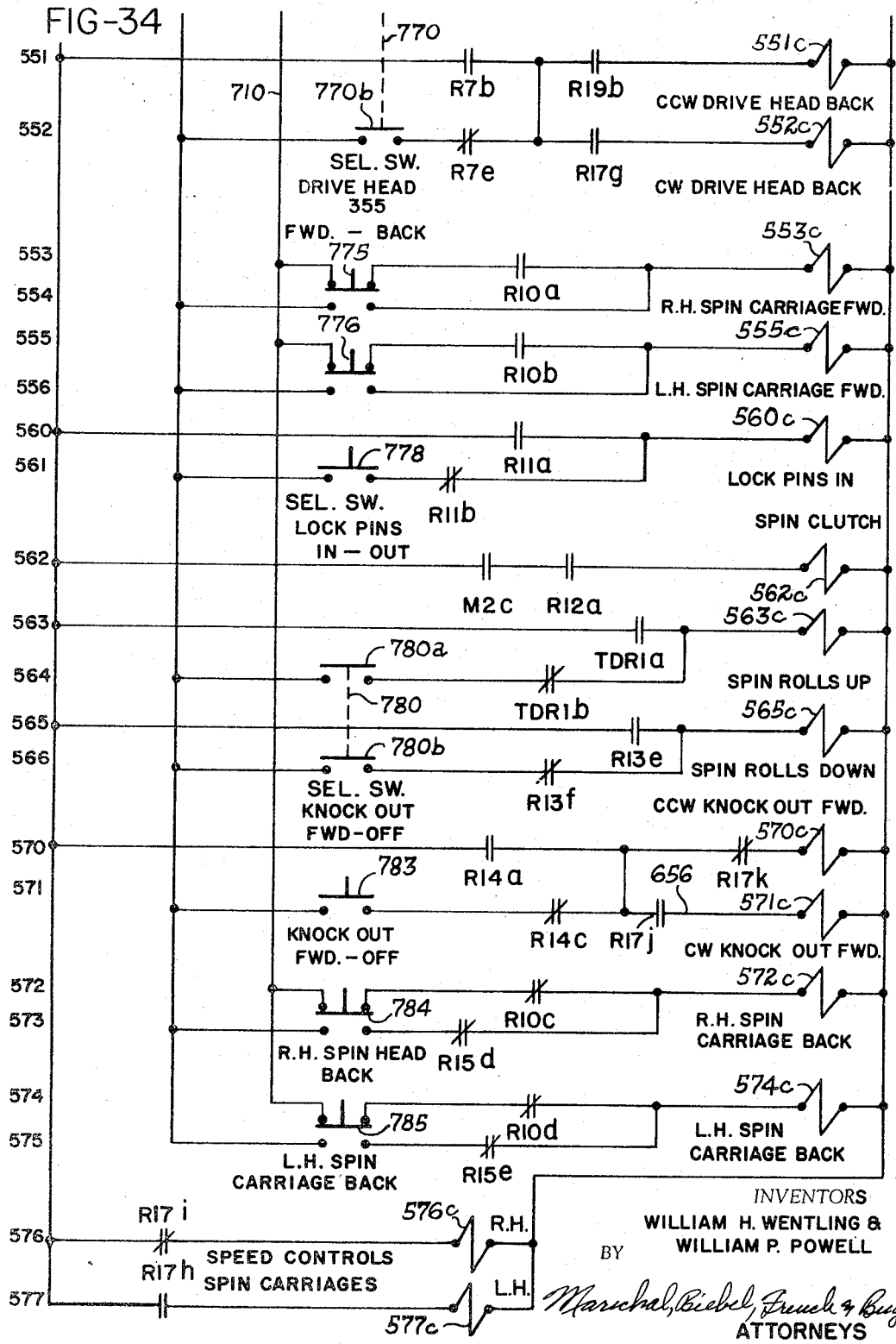

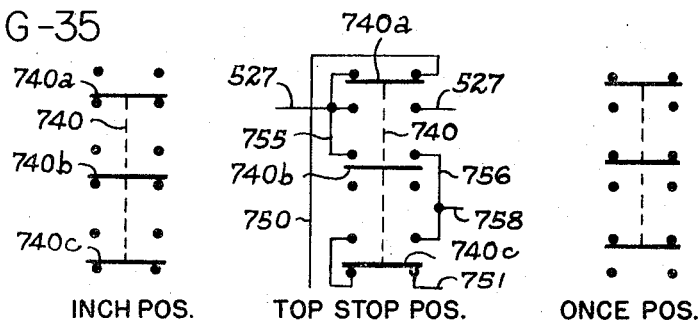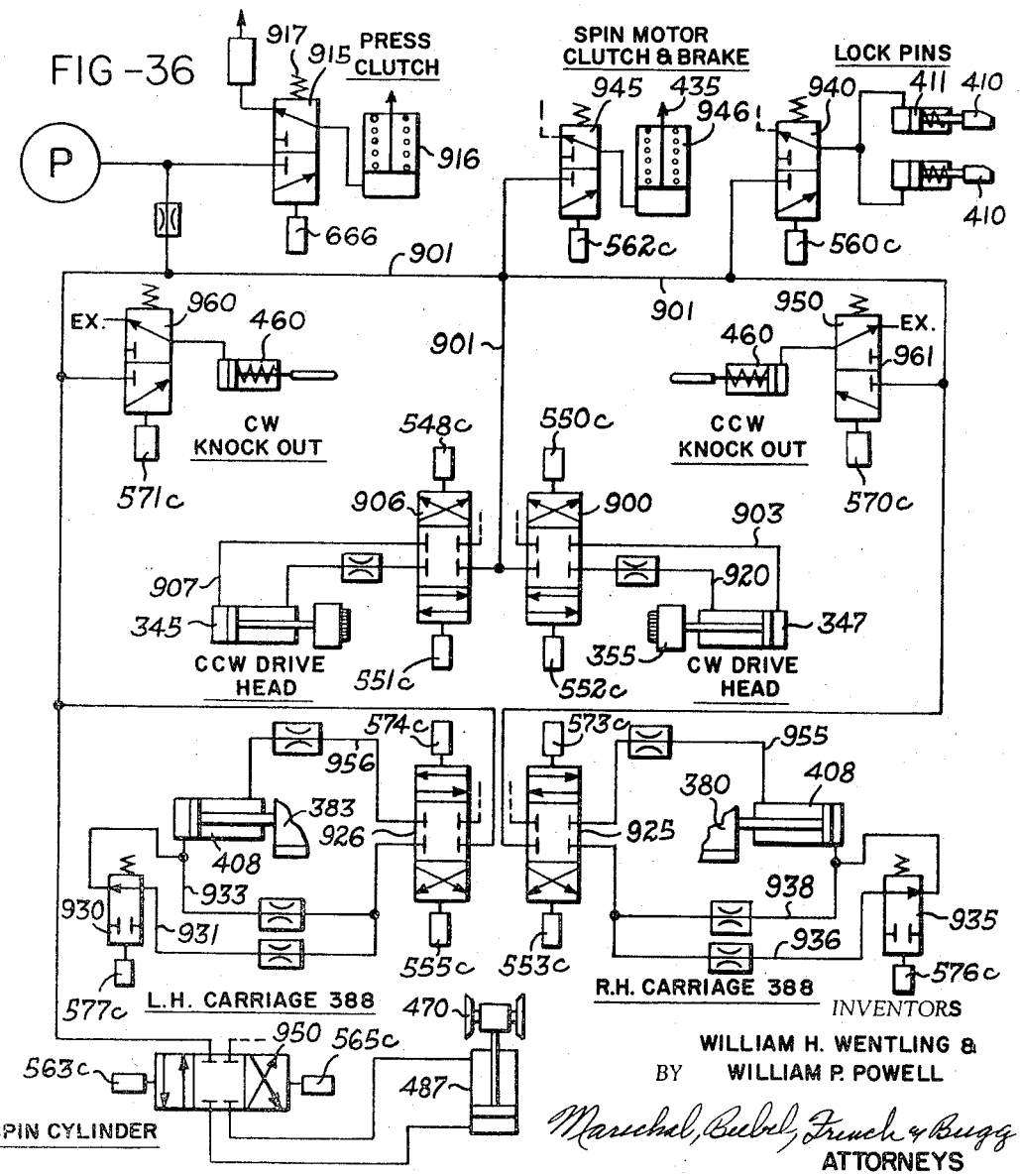

3,305,912
CENTRIFUGAL FAN MANUFACTURING
William H. Wentling and William P. Powell, both of Dayton, Ohio, assignors to The Lau Blower Company, Dayton, Ohio, a corporation of Ohio
Original application Aug. 9, 1962, Ser. No. 215,988, now Patent No. 3,253,318, dated May 10, 1966. Divided and this application Sept. 13, 1965, Ser. No. 486,682
6 Claims. (Cl. 29—23.5)

This application is a division of our copending application Serial No. 215,988, filed August 9, 1962, now Patent No. 3,253,318, issued May 10, 1966 and assigned to the assignee of this application.

This invention relates to multiblade centrifugal fans of the type commonly known as blowers, and to rotors or blower wheels therefor.

More particularly, this invention concerns a new centrifugal blower wheel and the automatic manufacture thereof, which includes the production of individual glades, the mounting of these blades on a fixture in a predetermined relationship corresponding to their relative positioning in the blower wheel, and the securing of an end ring and back plate on opposite ends of these blades while on the fixture thus forming a finished blower wheel. The apparatus or machinery which performs the above operations is also capable of manufacturing blower wheels having different diameters, number of blades and blade lengths, as well as blower wheels for clockwise and counterclockwise rotation while requiring a relatively small amount of time and attention by a single operator. In addition, this machine permits a wide selection of materials from which the blower wheel components are formed.

An important object of this invention is to provide methods and apparatus for automatically manufacturing centrifugal blower wheels, and specifically for the automatic production of blower wheels having varying diameters, number of blades, blade lengths and configurations, as well as blower wheels which rotate in a clockwise or counterclockwise direction.

Another object of the invention is to provide a method and apparatus for completely and automatically producing blower wheels from sheet metal, and particularly to provide such a method and apparatus which will simultaneously perform operations on a number of blower wheels so that the rate of production is increased above that generally known throughout the prior art.

A further object of the invention is to provide apparatus for producing finished blower wheels from metal stock, and particularly to provide apparatus of this type which includes a control system for complete automatic operation requiring a minimum of attention from the operator, or which can be adapted for manual operation wherein the operator must manually initiate each operation of the machine.

A further object of the invention is to provide a fixture which receives, holds, and aligns a plurality of blower wheel blades in a predetermined position corresponding to their position in a blower wheel, and which is adapted to facilitate the automatic placement of the end ring and back plate on the ends of the aligned blades.

A still further object of the invention is to provide a method and apparatus for forming individual blower wheel blades having complex curved surfaces thereon from various types of material, including steel and aluminum, by progressively forming the blade curves and other blade components.

It is a further object of the invention to provide methods and apparatus for automatically fabricating blower wheels wherein the individual blades are successively formed, assembled and held in a desired circumferent alignment about a central axis, and then an end ri and a back plate are secured to opposite ends there thus producing finished blower wheels without requ ing more than cursory attention from the operator.

Another object of the invention is to provide an i proved blower wheel which is simple and economi in construction, which can be made at less expense th wheels heretofore available, which has individual blac shaped to develop the most desirable performance a air delivery, and which is of high strength and rigid and capable of operating with freedom from objectic able vibration and noise at high speeds.

It is a further object to provide a blower wheel co: prised of a plurality of separate blades which are asse bled and securely held in proper operative position wit out the use of any heating operation making possil the use of blades which have been galvanized or oth( wise surface treated, and further enabling the use of nc metallic blade materials where desired, and particular to provide blowers of this type which have superi strength, stiffness, and concentricity.

Other objects and advantages of the invention will apparent from the following description, the accompan ing drawings and the appended claims.

In the drawings:

FIG. 3 is a side elevational view of the apparati shown in FIG. 1;

FIG. 4 is a plan view of a portion of the die mech nism with the top die shoe removed and the metal stoc partially broken away;

FIG. 5 is a sectional view through the die taken esse1 tially along the line 5—5 of FIG. 4 including a shov ing of the top die shoe;

FIG. 6 is a slightly enlarged fragmentary view of tl metal stock illustrating the various steps which are pe formed thereon as it progresses through the die;

FIG. 7 is a sectional view essentially along the lir 7—7 of FIG. 4 and showing the top die shoe in a raise position;

Figure 1:
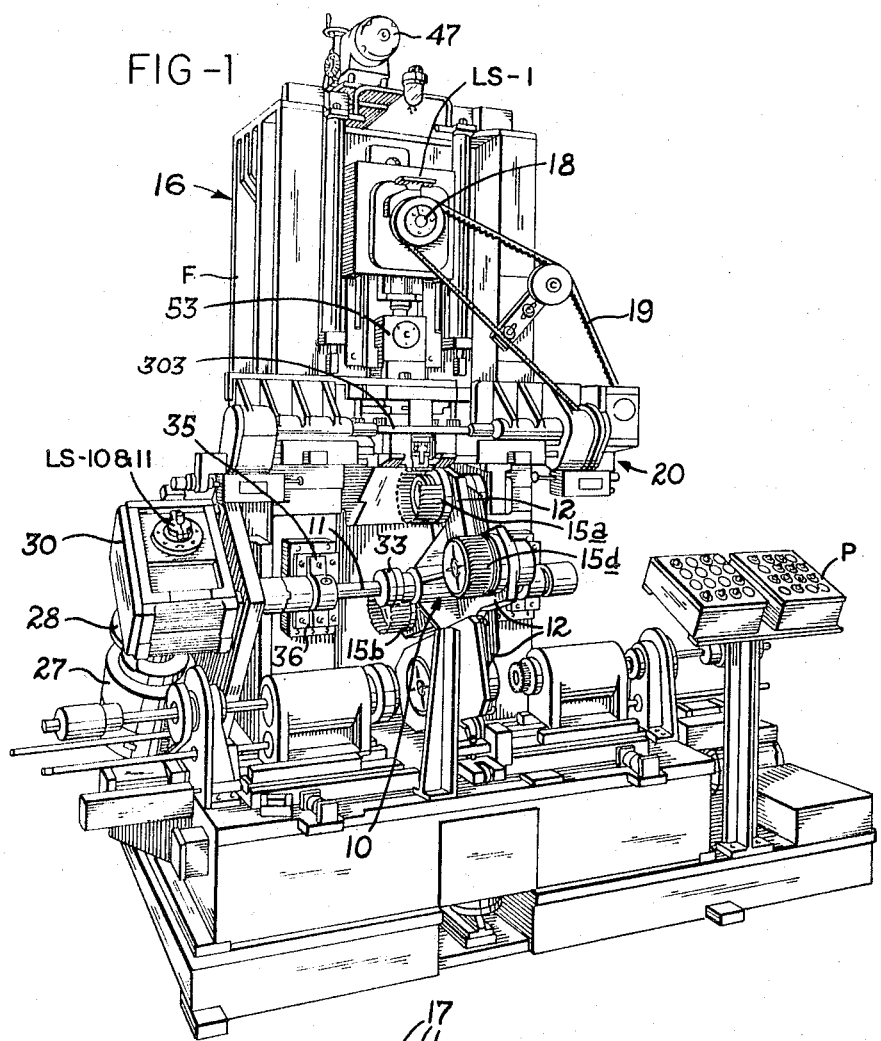
FIG. 1 is a view in perspective illustrating apparat for producing counterclockwise blower wheels in a cordance with the invention.
Figure 23:
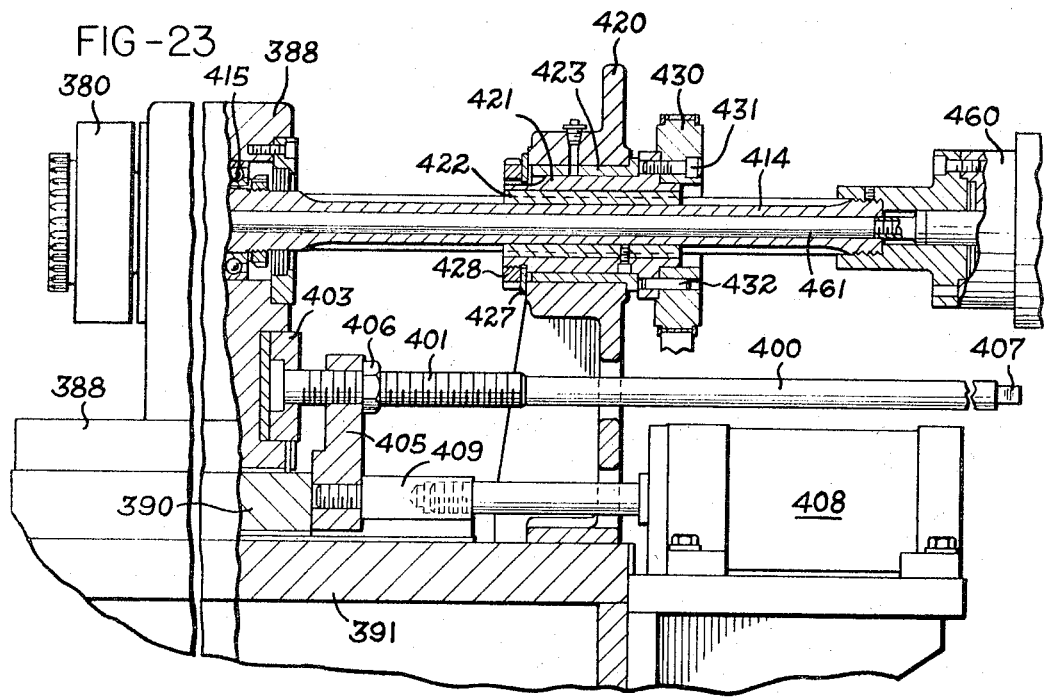
Figure 24:
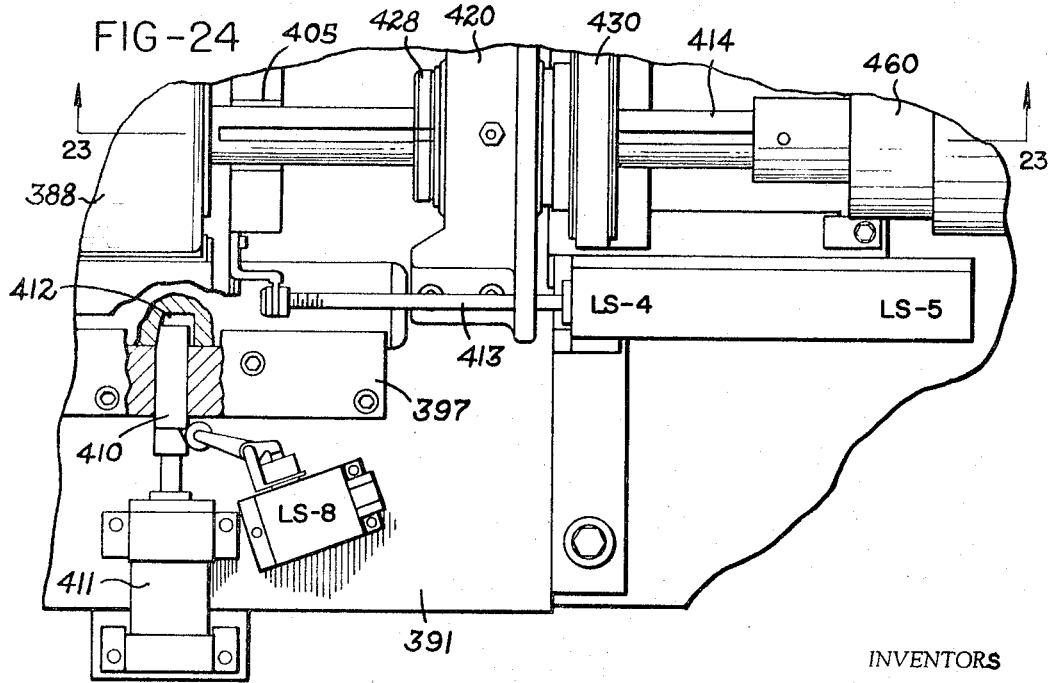

FIGS. 8 through 12 are sectional views similar to FIC 7 taken along the lines 8—8 through 12—12, respe( tively, of FIG. 4 and showing the top die shoe in i raised position;

FIG. 13 is a view along the view line 13—13 c FIG. 12;

FIG. 14 is a fragmentary view illustrating the mar ner in which the individual blades are secured on th index heads;

FIG. 15 is a section essentially along the line 15—1 of FIG. 14 further illustrating the manner in which th blades are secured on the index heads;

FIG. 16 is a section through the index head driv mechanism;

FIG. 17 is a showing of the exterior structure of th index head drive mechanism;

FIG. 18 is a fragmentary sectional view of one of th latches which are utilized to secure the end rings on th index heads;

FIG. 19 is a fragmentary view of the drive keys o1 the index heads;

FIG. 20 is a sectional view taken essentially along the line 20—20 of FIG. 16;

FIG. 21 is an elevational view of the lower portio1 of the machine shown in FIGS. 1 and 3 illustrating the spinning mechanism;

FIG. 22 is an enlarged sectional view of a portion of spinning mechanism showing the spin carriages in ir advanced position;

FIG. 23 is a view, partially in elevation and partially section, of one side of the spinning mechanism with section being taken along the line 23—23 of FIG. 24;

FIG. 24 is an enlarged plan view of a portion of the nning mechanism;

FIG. 25 is an elevational view looking generally along view line 25—25 of FIG. 21;

FIG. 26 is an enlarged fragmentary sectional view of latch mechanism which engages the back plate in the ck plate guide;

FIG. 27 is an enlarged view partially in section and rtially in elevation of the spin roll actuating mechism;

FIGS. 28 and 29 are enlarged sectional views illusiting the end ring and back plate before and after the inning operation;

FIGS. 30 through 35 are schematic views of the elecical control system; and

FIG. 36 is a schematic view of the fluid control ciritry.

*General description*

Figure 2:
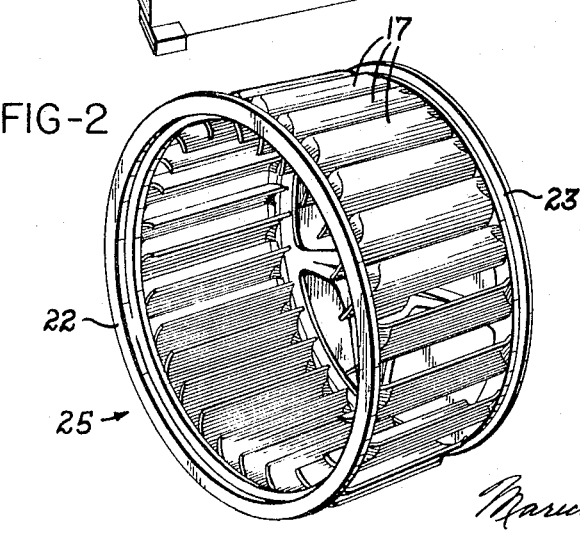
FIG. 2 is a perspective view of a clockwise blow wheel which can be produced by the apparatus shov essentially in FIG. 1.

Referring to the drawings, which illustrate a preferred ibodiment of the invention, FIG. 1 shows a blower ieel making apparatus or machine including a Ferris ieel 10 mounted for rotation on the drive shaft 11, and ving four radially extending arms 12 each with an dex head 15 thereon. The Ferris wheel 10 sequenilly moves each of the index heads 15 through a series stations wherein the various components of the maiine cooperate therewith to perform the steps in the aking of a blower wheel (FIG. 2). As will be seen, e machine simultaneously performs operations on a imber of blower wheels, and produces a finished blower heel for each one quarter revolution of the Ferris wheel ). It is pointed out that the index heads 15 are identiil and the lower case letters *a* through *d* are suffixed iereto solely for indicating the stations at which they ive been positioned by the Ferris wheel 10.

Thus, tracing the production of one blower wheel irough the machine, the index head 15*a* is shown posioned at the blade receiving station for cooperation with ie press 16 which is suitably mounted in the upper poron of the machine frame F for operating a die which :ceives a strip of metal stock S (FIG. 3) through the ar of the machine and forms individual blower wheel lades 17 therefrom. As will be seen, these blades are utomatically transferred to the index head 15*a* which :ceives and securely holds them in a predetermined paced relationship corresponding to their relative posions in the finished blower wheel. While at the blade :ceiving station the index head 15*a* is driven from the rank shaft 18 of the press 16 through the timing belt 9 and the index head drive mechanism, indicated generally at 20, so that the rotation of the index head 15*a* correlated with the operation of the press 16 thus properly aligning the index heads to receive each individual lade 17 as it is transferred from the press 16.

After the index head 15*a* receives the proper number f individual blades, the Ferris wheel 10 is automatically otated through 90° in a counterclockwise direction, as iewed in FIG. 3, so that the index head 15*a* will now e positioned at a dead station, indicated in FIG. 3 by he index head 15*b*. This station is provided primarily o that the three active stations may have more convenent locations, and therefore this station may be eliminated without departing from the scope of the invention. uch elimination would merely require the use of a Feris wheel having three equally spaced arms thereon and uitable changes in the location of the three active staions and their associated machine components.

The Ferris wheel 10 is subsequently advanced another )0° so that the index head 15 is now at the spinning station, indicated by the index head 15*c*, wherein the end ring 22 and back plate 23 are spun over the flange 24 (FIG. 28) on each end of the individual blades 17 to produce a finished blower wheel 25 (FIG. 2). Upon completion of the spinning operation the Ferris wheel 10 is indexed once again to the operator's station, indicated by the index head 15*d*, wherein the operator removes the finished blower wheel 25 and places an end ring 22 on the index head 15*d* for use in the production of the next blower wheel. It should now be apparent that four blower wheels 25 are simultaneously in the process of being produced since there are four stations and four index heads 15 on the Ferris wheel 10, and that for each revolution of the Ferris wheel one blower wheel is produced.

The Ferris wheel 10 is indexed or rotated between the aforesaid four stations by the motor 27 (FIG. 3) which drives the shaft 11 and the Ferris wheel 10 through the clutch-brake unit 28 and the conventional Geneva motion unit 30. The clutch of unit 28 is provided since it is not feasible to bring the motor 27 up to speed each time the Ferris wheel 10 is to be indexed, and the brake of this unit is engaged at all times except when the clutch is engaged so that the rotation of the Ferris wheel 10 is substantially prohibited except when it is being indexed. As is well known, the Geneva motion drive unit 30 provides an output speed which is sinusoidal so that the speed of rotation gradually increases to a peak and then gradually decreases to that there is no sudden or jerking movement which might cause the positioning of the Ferris wheel 10 to deviate from the aforesaid four stations.

The machine is capable of producing blower wheels having various diameters and blade lengths, as well as blower wheels for clockwise or counterclockwise rotation. (To determine whether a particular blower wheel is a clockwise or counterclockwise wheel, it is viewed in an axial direction from the external side of the back plate and the direction of rotation determined.) To illustrate the versatility of the machine, it has been shown as making a counterclockwise wheel whereas FIG. 2 illustrates a clockwise wheel. In changing the present machine from the production of counterclockwise to clockwise wheels, it is necessary to remove the Ferris wheel 10 and replace it in a reversed manner so that the index heads 15 are changed from the left-hand to the right-hand side of the Ferris wheel, as viewed in FIG. 1. Thus the detachable couplings 33 (FIG. 1) of a conventional type are provided in the drive shaft 11 on either side of the Ferris wheel 10 so that the latter can be readily removed and reversed or replaced.

The capability of producing blower wheels 25 of varying diameters requires that a Ferris wheel 10 having index heads 15 thereon, which correspond to the diameter of the blower wheel to be made, be provided for each diameter wheel that will be produced. The distance between the point at which the blades 17 enter the index head 15*a* and the axis of rotation of the index head 15*c* at the spinning station is the same in each of the Ferris wheels 10 so that they can be easily interchanged on the machine with a minimum of set-up time. Since this distance is held constant and the outer diameter of the index heads 15 varies with the diameter of the blower wheel being produced, the axis of rotation of each Ferris wheel 10 relative to the machine will be different for each diameter of blower wheel that is produced.

Thus the drive shaft 11 is mounted in the bearing blocks 35 which are vertically adjustable in the track members 36 secured to the machine frame F, and the mounting plate 42 (FIG. 3) having the motor 27, clutchbrake unit 28, and Geneva motion unit 30 thereon is secured to a carriage 43 which rides in suitable guide tracks 44 so that it can be raised or lowered by turning the screw 45 to effect vertical movement in the appropriate direction thereby easily adjusting the output of the Geneva motion unit 30 to accommodate the various positions of the drive shaft 11.

Press and die mechanism

The press 16, shown in FIGS. 3-12, is driven by the motor 46 through the press clutch 48, and operates the die mechanism 50 (hereinafter called "die") for producing the individual blades 17 from the metal stock S and for transferring these blades to the index head 15a. The die 50 includes a top die shoe 52 which is connected to and reciprocated by the ram 53 (FIG. 1) of the press 16 and a stationary bottom die shoe 54, each having a plurality of die steels thereon which mate with one another to produce an individual blade 17 each time the die shoes 52 and 54 are engaged.

The press 16 may be of any commercially available design which is capable of fulfilling the herein described functional requirements, and apart from the combination does not constitute part of this invention. A conventional die feed mechanism 55 (FIG. 3) is provided for feeding the metal stock between the die shoes 52 and 54 at a predetermined rate each time the press 16 raises and lowers the top die shoe 52. For example, a suitable feed mechanism for this purpose which is commercially available is model "Dickerman 6 Inch Die Feed" sold by the H. E. Dickerson Manufacturing Company, of Springfield, Massachusetts.

In setting up the machine the feed mechanism is disengaged, the press ram 53 is moved to its top dead center position and the leading edge of the metal stock S is inserted into the die 50 until it engages the projection 57 on the stop 58 (FIGS. 4 and 5) supported on the rod 61 which is journalled in the support blocks 62 on either side of the path of movement of the metal stock. Then the feed mechanism 55 is engaged so that metal stock is fed automatically into the die 50 in response to reciprocation of the press 16 from this point on. Specifically, for each stroke of the press 16 the metal stock is advanced a distance d (FIG. 6) equal to the length of metal required for each blade 17.

During the initial press stroke the lever 64 connected to the rod 61 is depressed manually to raise the stop 58 in a counterclockwise direction, as viewed in FIG. 5, to release the leading edge of the metal stock thus permitting the feed mechanism 55 to move the metal stock between the die shoes 52 and 54. Thereafter the stop 58 rides on top of the metal stock and, insofar as the operation of the die 50 is concerned, is substantially inoperative.

At the first station in the die 50, the width of the stock is trimmed and the notch 66 is cut in each lateral edge thereof as shown in FIGS. 4-6. This is accomplished when the male cutter 68 (FIG. 7) having the notch cutting tool 69 rigidly or integrally secured in one corner thereof is forced into the complementary female opening 71 (FIGS. 4 and 7) in the bottom die steel 72 by movement of the top die shoe 52 into engagement with the bottom die shoe 54. The metal which is cut from the stock in this operation passes through the openings 71 and 74 in the bottom die steel 72 and shoe 54, respectively, to a collection hopper (not shown) positioned at some point exterior of the machine in a well known manner.

The die 50 controls the movement of the metal stock therethrough by the use of two pilot pins 75 on each side of the metal stock S, each of which engages a notch 66 and thus limits the forward, backward, and lateral movement of the metal stock so that it will be precisely positioned with respect to the various components of the die 50. Each of the pins 75 is secured on the top die shoe 52 by a threaded plug 77 which engages the similarly threaded bore 78 in the shoe 54 to clamp the heads 81 of the pins against the support block 83 which is rigidly secured to the die shoe 54, and a second plug 84 is provided for locking the plug 77 against movement. The lower portion 85 of each pin 75 has a rectangular cross-section which corresponds to the shape of the notches 66, and the nose 87 thereof is tapered or bullet shaped so that, when the pins 75 are lowered into engagement with the bottom female grooves or slots 88 in the bottom die steel 9 they will engage the notches 66 and properly align t metal stock.

A spring block 93, shown best in FIGS. 4, 5, and 7, mounted on the lower die shoe 54 for raising the met stock when the top die shoe 52 is moved to the rais position thus allowing the metal stock to be advanc without interference from the various lower die stee The spring block 93 is positioned between the side bloc 95 (FIG. 4) which have the overhanging fingers 96 (FI 7) for stripping the metal stock from the upper die stee as the top die shoe 52 is raised. This block is urged u wardly by the spring 97 (FIG. 5) interposed between tl block 97 and the bottom die shoe 52, and the upwa travel thereof is limited when the shoulders 98 form on the die steels 101 and 102 engage similar shoulde 104 on the spring block 93, as seen in FIG. 5.

A clamping plate 105 (FIG. 7) provided on the upp die shoe 52 initially engages the metal stock and holds against the spring block 93 as the die shoes 52 and 54 a moved together. The plate 105 is mounted on the tc die shoe 52 by the support pins 107 which extend throug the die shoe 52 into threaded engagement with the pla 105, and the heads 106 thereon limit the downward mov ment of the plate 105 with respect to the top die shoe 5 The clamp plate 105 is substantially coextensive with tl spring block 93 so that when the top die shoe 52 mov downwardly, the clamp plate holds the metal stock again the spring block 93.

The springs 108 which are interposed between the bloc 83 and the clamp plate 105 have a total effective bi which is greater than that of the springs 97 acting on th spring block 93 so that the spring block 93 is forced dowr wardly when the top die shoe 52 first contacts the met stock. When the travel of the spring block 93 is take up, the clamp plate 105 is moved in an upward directio relative to the die shoe 52 to expose the cutting tool 6 so that the metal is held firmly in position during th trimming and notching operations. As shown in FIG. the leading ends 87 of pilot pins 75 engage the notches 6 in the metal stock before the plate 105 and block 93 reac their clamping positions so that the pins properly alig the metal stock prior to its being clamped against move ment.

The next operation is to bend or turn up the edge o the metal stock to a vertical position, as shown in FIG. to form the flange 110 along each side of the metal stoc which ultimately forms the flanges 24 (FIG. 28) on eac end of the blades 17. This bending operation is accom plished when the metal stock is forced downwardly ont the die steels 112, shown in FIGS. 4 and 10 which ar positioned below the overhanging portion 113 of the sid blocks 95 so that the fingers 96 extend above the meta stock at this station and thus limit its upward movemen The leading edge 115 (FIG. 4) of the die steel 112 is ap propriately curved so that when the complementary uppe die steel 116 forces the metal downwardly thereagainst each edge of the metal stock is turned up to form a flang 110, as shown in FIG. 6. The upper die steel 116 i mounted on a spring block 117 which has a limitec amount of spring biased travel between the shoulders 11 and 119 of the spring block 117 and the mounting mem ber 121, respectively, so that the metal stock will be hek firmly in position prior to this shaping operation. As wil be seen, the spring block 117 and the mounting member 121 on either side thereof extend forwardly from thi station to the cutoff station.

The next station in the die 50 performs a piercing operation which cuts the elongated slots 125 (FIGS. and 6) in each side of the metal stock a short distance from the flange 110. Each slot has a curved portior 126 on the leading end thereof and defines the latera extremities of the blade surface 127 on one side and the flange 110 on the other with the connecting portion 128 remaining between the trailing edge of the blade surface and the flange 110. As shown in FIG. 5, the ts 125 are cut by an appropriately shaped punch 129 ld on the top die shoe 52 by the threaded plugs 131 ich engage the similarly threaded bore 132 to clamp e head 133 of the punch 129 against the support member 134 rigidly secured to the top die shoe 52. The nch 129 is received in the complementary female ening 135 (FIG. 4) formed between the die steels 7 and 138, and the metal which is punched from the etal stock passes through the openings 141 to a point terior of the machine.

Next the metal stock passes through a series of blade rming stations, as seen in FIGS. 4 and 5, wherein the ade surfaces 127 of the individual blades 17 are progressively shaped. Thus a slit or lance 145 is first cut terally across the metal between the curved portion 6 of the elongated slots 125 by the top die steel 146 hich is connected to the upper die shoe 52 by the bolts 7 and has the cutting edge 148 thereon which cooperates with the bottom die steels 151 and 152. At e next station, the forward or leading edge 153 of e blade surface 127 is formed by the top die steel 54 which cooperates with the bottom die steel 155.

Then, after a dead station, the center and trailing portions 157 of the blade surface 127 together with the anted shoulders 158 (FIGS. 6 and 11) are formed by ooperation between the top die steels 161 and 162 and e bottom die steels 164 and 165. Each slanted oulder is formed on a connecting portion 128 and ermits the leading edge of the blade surface 127 to be ised above the plane of the metal stock, and as shown FIG. 11, the shoulder forming die steel 162 is ounted on the spring block 117 and has a downwardly xtending finger 166 rigidly secured thereto for cooperaon with the appropriately shaped groove 167 in the ottom steels 164 and 165 to form the slanted shoulder 58 on the metal stock. Since the die steel 162 is also ounted on the spring block 117, the finger 166 engages he metal stock and holds it firmly prior to the forming peration.

Another spring block 170 (FIGS. 4, 5, 8 and 11) is rovided on the lower die shoe 54 and extends from one ide of the metal stock to the other on either side of he die steel 164 so that the metal stock in this part f the die 50 will be auomatically raised above the arious bottom die steels each time the top die shoe 52 s raised, thus facilitating the forward advance of the tock. As shown in FIG. 8, the spring block 170 is rged upwardly by the springs 172 which are interposed etween the bottom die shoe 54 and the block 170, and he upward movement thereof is limited by engagement f the shoulders 173 and 174 on the side members 176 and the block 170, respectively.

The die steels 164 and 165 which coact with the ingers 166 to form the slanted shoulder 158 must be precisely positioned with respect to the finger 166 and consequently they are rigidly secured to the bottom die shoe 54. Thus the spring block 170 is provided with a cutout portion 177 having cross members 178 and 179 on either side of the die steel 164 (FIG. 4) so that the block 170 may be formed as a single unit. The spring block 170 has the shoulders 180 (FIGS. 4 and 8) formed therein for support of the flange 110 of the metal stock so that blade surfaces 127, after they have been formed, do not absorb the entire upward force applied to the metal stock when the upper die shoe 52 is moved upwardly causing the spring block 170 to raise the stock above the die steels on the lower die shoe 52.

After the blade surfaces 127 on the metal stock have been completely formed, they move through two dead stations above the cross member 179 of the spring block 170 into the cutoff station wherein the individual blades 17 are severed from the metal stock. For this purpose, the cutoff tools 185 (FIG. 9) are secured to the upper die shoe 52 by the threaded plugs 187 which engage the similarly threaded bore 188 and clamp the head 191 of each tool 185 against the support member 192 which is rigidly secured to the die shoe 52.

The spring biased clamping block 117 has downwardly extending fingers 193 secured thereto which engage and hold firmly the metal stock as the upper die shoe is lowered so that it is held firmly in position prior to the cutoff operation. Specifically, as the die shoe 52 is lowered, the fingers 193 engage the stock on the inboard side of the upturned edge 110 and carry it into position on the lower die steels 194 and 195 to thereby hold it in position. As the upper and lower die shoes are moved together, additionally the cutting edge 196 of the tool 185, which is normally aligned with the fingers 193, is extended through the aperture 197 in the spring block 117 and into the slot 198 in the die steel 194, wherein it cuts the portion 199 between the notch 66 and the slot 125 from the metal stock thus severing the blade 17. The metal portion 199 cut from the stock passes through the opening 201 to a point exterior of the machine in the usual manner. The severed blade 17 is held firmly in position on the die steels 194 and 195 by the slidable plate 202 which is urged to the right, as viewed in FIG. 9, by the spring 204 interposed between the head 205 of the screw 207 and the flange portion 208 of the plate 202.

As the upper die shoe 52 moves upwardly, the pusher 210 (FIG. 5) mounted on one end of the rack 211 engages the severed blade 17 and forces it through the horizontal tracks 212, which engage the flanges 24 on each end thereof, to the position shown in broken lines in FIG. 5. The rack 211 is reciprocally mounted below the path of movement of the metal stock and is driven by a pinion 215 which is rotatably mounted in the machine frame F below the lower die shoe 54 and is driven from another rack (not shown) secured to the press 16 so that the rack 211 moves forward each time the upper die shoe 52 is raised, and returns as the die shoe 52 commences its downward stroke. A suitable bearing element 217 is provided for frictionless support of the forward end of the rack 211. When the rack 211 and the pusher 210 are being returned, the metal stock is in its raised position due to the action of the spring block 170 thus permitting the pusher 210 to move freely thereunder. Other drive means can be utilized to reciprocate the rack without departing from the scope of the invention so long as the above described functional requirements thereof are substantially maintained.

As shown in FIGS. 12 and 13, after a blade 17 is moved through the horizontal tracks 212, it passes into a short section of track 220 on the pivotal mounting block 221 wherein it is aligned with the vertical track 222 formed between the elongated side members 225 and 226. When in the track section 220, pressure is exerted in a longitudinal direction on the blade 17 by the spring 227 which is interposed between the plug 228 and the piston 230 and acts through the rod 231 to urge the block 221, when pivots about the mounting pin 233, against the blade 17, thus holding it firmly in position.

As the upper die shoe 52 moves downwardly, the transfer member 235 (FIG. 5) engages the blade 17 in the track section 220 and carries it through the vertical track 222 between the elongated members 225 and 226 into holding engagement with the index head 15a, as will be described. The lower guide 220a of track section 220 has a thickness less than the upper guide 220b and is slightly rounded so that when the transfer member 235 engages the blade 17, it will cam the block 221 in a counterclockwise direction (FIG. 12) to release the blade 17. The leading edge 237 (FIG. 5) of the transfer member 235 is suitably curved and has a projection 238 thereon for engaging the rear or trailing edge of the blade 17 to prevent angular movement thereof as it is moved downwardly in the track 222.

The track member 222 is also pivoted about the pin 233 and is biased into clamping engagement with the blade 17 by the spring 240 which is interposed between the head 247 of the pin 243 and the plug 244, and exerts a pressure on the member 222 through the pin 243 so that the clamping pressure is applied to the blade 17 and movement through the track 222 is induced only by the transfer member 235. Both the track members 212 and 220, and the side members 224 and 225 are preferably formed from hardened metal having a high degree of finish to its surfaces so that the blades 17 move easily therethrough with a minimum of friction and wear. Since the structure shown in FIG. 12 is identical to that on the opposite side of the die 50, only one side has been illustrated and described.

It should now be apparent that, after the stock is initially fed through the die 50, a blade 17 will be manufactured and transferred to the index head 15a during each stroke of the press. As shown in FIG. 5, the top and bottom die shoes 52 and 54 each have the various spring blocks, die steels, etc., secured thereto so that they may be readily removed and replaced so that blades of different length can be formed by the machine with a minimum of set-up time.

While the above described apparatus for producing the individual blade 17 is preferred, it is within the scope of this invention to use other and different apparatus for this operation. Similarly, while the production of the individual blade by the machine is preferred, it is possible to manufacture the blade 17 separately and modify the transfer member 235 and associated structure to transfer the blade to the index head 15a so that the machine fabricates the blower wheels from components formed by other machines.

Index heads

Referring now to FIGS. 16 and 22, each of the index heads 15 is identical and, as mentioned, the letters a through d are suffixed for distinguishing the stations in which the Ferris wheel 10 has positioned the index heads 15. Each of these index heads includes a body member 250 supported for rotation in a bore 251 formed in the arm 12 of the Ferris wheel 10 by the bearings 253 so that the index head 15 will rotate freely therein. The body member 250 has a bore 255 in the central portion thereof for receiving the reciprocal fixture on ring holder 256, and the bearing sleeve 258 is provided therebetween for reducing friction as the fixture 256 reciprocates axially in the bore 255.

The guide pins 260 are rigidly mounted on the body member 250 and extend into the guide bores 261 in the shoulder 263 of the fixture 256 for the purpose of preventing relative angular movement between the member 250 and the fixture 256 while permitting relative reciprocal movement therebetween. Similarly, the screws 264 extend through the bores 265 in the member 256 into threaded engagement with the body member 250 for limiting the axial movement of the fixture 256 away from the body member 250. Interposed between the body member 250 and the shoulder 263 are a number of coil springs 266 (only one is shown) for the purpose of urging the fixture 256 in an axial direction away from the body member 250 to the position shown in FIG. 22.

Three rings 270 which receive and hold the blades 17 are suitably secured to annular spacers 271 which are in turn secured to the shoulder 263 of the fixture 256. The rings 270 have substantially identical configurations which include a plurality of equally spaced slots 273 (FIGS. 14 and 15) cut in the outer periphery thereof. These slots have a curved surface 275 on one side thereof for engagement of the similarly curved blade surface of the blades 17, while the other side of the slots 273 have the smoothly curved projection 276 thereon for engaging the opposite side of the blade surface. As seen in FIG. 14, the center ring 270b is mounted with its slots 273 angularly offset with respect to the slots in the outside rings 270a and 270c so that when the leading edge of a blade 17 is forced into the slots aligned in the three rings 270 by the transfer member 235, the blades 17 will be subjected to a limited amount of tension and thus held firmly in position on the index head 15.

Referring again to FIGS. 16 and 22, a knockout screw 280, which is utilized to release a finished blower wheel 25 from the index head 15, threadedly engages the tapped bore 281 in the central portion of the fixture 256. The relative position of the screw 280 can be adjusted with respect to the member 256 by merely loosening the lock nut 283, and appropriately turning the screw 280 until the desired adjustments have been made. When the fixture 256 is forced to the right, as viewed in FIG. 22 by the screw 280, the ring 270a is moved against the surface 284 of the body member 250 and is slipped from engagement with the blade 17 so that the other ring 270b and 270c hold the blower wheel rather loosely on the index head.

The end ring 22 which is positioned on an index head 15 before the blades are placed thereon, is held around the outer periphery of the left side of the body member 250 (as viewed in FIG. 22) by the spring biased latches 285 (FIG. 18) having a cam portion or nose 286 which engages the radially extending inner flange 22a of the end ring 22 for the purpose of holding it in position on the shoulder 287 formed on the body member 250. The latches 285 are released by exerting a force on the end ring 22 in the direction to separate it from the body member 250, which causes the noses 286 of the latches to cam the latches 285 radially inwardly thus releasing the end ring 22. The filler blocks 288 (FIG. 16) are secured to the spacers 271 between the rings 270 at three or more points around the spacers 271 so that the end rings 22 can be easily slipped over the rings 270 into engagement with the body member 250. The ring 270c (FIG. 18) is cut out at 289 for clearance of the latches 285 as the fixture 256 is moved against the body 250 during the knockout operation.

The drive end of the index heads 15 has an extension 290 thereon having the annular drive member 291 secured thereto by a key 293, which locks these two members against relative angular movement, and by the nut 295 which is threaded onto the extension 290 and prohibits relative axial movement therebetween. A number of key elements 296 (FIG. 19) are secured equally around the drive member 291 in the annular slots 297 formed in the member 291 so that the teeth 298 thereon will be engaged by drive heads for rotating the index heads 15 during the blade receiving and spinning operation, as will be described.

Index head drive mechanism

When the the index head 15a is receiving the individual blades 17 from the transfer member 235, it is driven from the crank shaft 18 of the press through the index head drive mechanism 20 so that the rotation of the head 15c is correlated with the operation of the transfer member 235, and the slots 273 in the rings 270 are positioned to receive each individual blade 17 as it is carried downwardly from the die 50. Accordingly, as shown in FIGS. 1 and 16, the timer belt 19 transfers rotary power from the crank shaft 18 of the press 16 to the gear box 301, which drives the transfer shaft 303 extending across the entire width of the machine, as indicated in FIG. 1, so that the index heads 15a can be driven regardless of the side of the Ferris wheel 10 on which they are mounted.

The transfer shaft 303 has a removable section 303a in the central portion thereof for permitting access to and removal of the die 50, as well as to give minute adjustment from left to right and allow for tolerance in this drive mechanism, and the connection sleeves 305 (only one is shown in FIG. 16) are provided so that the section 303a may be easily removed. The sleeves 305 are secured against relative angular movement on the end portions 307 of the shaft 303 by the keys 308, and they are locked to section 303a by the tapered pin 310 given into the complementary bore 311 extending through the sleeve 305 and the shaft section 303a so that during normal operation the shaft 303 and the section 303a act as a single integral shaft.

Both the right and left sides of the index head drive mechanism are substantially identical in construction and operation, and only the right side thereof, as seen in FIGS. 16 and 17, is described in detail. Thus the transfer shaft 303 is drivingly coupled to the output shaft 312 of the gear box 301 by the key 313 which engages the appropriately shaped grooves in both the drive shaft 312 and the transfer shaft 303. The transfer shaft 303 is rotatably supported in the machine frame by the bearings 315, and is held against axial movement to the right by the press fitted ring 317, and against movement to the left by the pinion 318 having the shoulder 319 which engages the thrust bearing 321 suitably secured to the machine frame.

A drive shaft 323 is similarly mounted on the bearing 325 in the machine frame below and substantially parallel to the transfer shaft 303, and axial movement thereof is prohibited by the rings 327 threadedly secured to its ends. The pinion 318 on the right end of the transfer shaft 303 rotates the drive shaft 323 through the meshing engagement with the gear 328 which is locked to the shaft 323 by the key 329 and the nut 330. The left end of the drive shaft 323 has a pinion member 331 rigidly secured thereon, and having elongated and axially extending teeth 32 which drive the gear 334 rotatably mounted in the slidable carriage 335 (FIG. 16).

The carriage 335 transfers rotary power from the drive shaft 323 to the index head 15a, and since the index heads 15 are movable with the Ferris wheel 10, the carriage can be shifted between an engaged position, as shown in FIG. 16 wherein it engages the index head 15a, and a retracted position wherein it is moved to a point spaced from the index head 15a. Thus, as shown in FIG. 20, the carriage 335 moves back and forth in a direction parallel to the axis of the drive shaft 323 on the rollers 337 and 338 which ride on the top of the tracks 340 and the side 341 of the bracket 343. These rollers are rotatably secured to the side members 344 which have the base 345 member releasably supported therebetween.

An air cylinder 347 has its piston rod 348 connected to the right end of the carriage 335 for the purpose of shifting it between the aforesaid advanced and a retracted position during which the gear 334 slides on the elongated teeth 332 of the pinion 331 so that the teeth of these two members are in meshing engagement regardless of the position of the carriage 335. The air cylinder 347 can have its position with respect to the machine frame adjusted by appropriately loosening and tightening the nuts 350 which threadedly engage the support member 351 of the air cylinder 347 and are positioned on either side of the bracket 353 extending from the machine frame. As shown in FIG. 17, the rod 354 which is connected to the carriage 335 operates the limit switches LS2 and LS3 to give appropriate indication to the electric controls of the position of the carriage and its associated apparatus.

As shown in FIG. 17, the drive head 355 which engages and drives the index head 15a is detachably mounted on the carriage 335 by the bolts 357 and the L-shaped clamp members 358 which engage the shoulders 359 formed on the drive head 355. This arrangement permits transfer of the drive head 355 to the carriage 335 on the left side of the machine during the production of a counterclockwise blower wheel wherein the back plate is applied to the opposite ends of the blade 17. A guide pin 360 (FIG. 16) is provided to insure that the drive head 355 will be properly aligned on the carriage 335 before the clamps 358 are engaged.

The drive head 355 has a gear 362 rigidly mounted therein on the shaft 363 and driven by the gear 334 rotatably supported on the pin 366 in meshing engagement with the pinion 331 on the drive shaft 323. The shaft 363 has a drive member 370 secured on the left end thereof for engagement with the index head 15a, and the central portion of this drive member is cup-shaped and has a bore 371 therein which accommodates the extension 290 on the index head 15a to align properly these two members when they are brought together.

The drive member 370 has a plurality of axially extending splines 373 (FIG. 16) on the outer periphery thereof similar to those shown in FIG. 23, each of which tapers to a point so that when the drive head 355 is moved into engagement with the index head, the splines 373 will easily and smoothly align with the teeth 298 of the index head 15a. An arm 375 is attached rigidly to the right end of the shaft 363 for the purpose of actuating a switch LS9 (FIG. 17) each time the shaft 363 is rotated one complete revolution, thus indicating that the index head 15a has been completely filled with the blades 17 so that the Ferris wheel 10 can be indexed.

*Spinning assembly*

The spinning assembly, shown in FIGS. 21 through 29, positions the end ring 22 and the back plate 23 adjacent the opposite ends of the individual blades 17 on the index head 15c and spins the outer peripheral flanges 377 on the end ring and back plate over the flanges 24 on the individual blades 17 thus producing a finished blower wheel 25. The assembly includes substantially identical structure on either side of the Ferris wheel 10 so that the assembly can be utilized regardless of whether a clockwise or counterclockwise blower wheel is being made. For producing a counterclockwise wheel the assembly utilizes a drive head 380 which engages and drives the index head 15c, a back plate guide 382 which properly locates the back plate 23 with respect to the index head 15c, a back plate head 383 which picks up the back plate 23 from the guide 38 and carries it into engagement with the blades 17 on the index head 15c, and a spinning wheel mechanism 385 which deforms the flanges 377 over the ends of the blades 17.

The heads 380 and 383 are supported for rotation by spin carriages 388 which are slidably mounted on the support members 390, as shown best in FIG. 25, and the support members 390 are mounted on the base 391 which is a portion of the machine frame F. In detail, the spin carriages 388 have hardened support feet 393 on each side thereof which are engaged by the inverted L-shaped clamps 394 suitably secured to the support member 390 so that relative movement between the members 388 and 390 is limited to a horizontal back and forth movement, as viewed in FIG. 21. Similarly, the movement of the support member 390 is limited since its support feet 396 are engaged by the L-shaped clamp members 397 secured to the base 391. The bearing strips 398 between the support member 390 and the base 391 are coextensive with the feet 396 for reducing friction and wear between these components.

As indicated in FIG. 21, the heads 380 and 383 are offset from the vertical center line of the machine although their travel into engagement with the index head 15c is the same. Consequently, when these heads are reversed, as required to make a clockwise wheel, the retracted position of the carriages 388 must be changed so that when they are advanced, the associated head 380 or 383 will properly engage the index head 15c. For this purpose the adjusting rod 400 (FIG. 23) having the threads 401 on one end thereof is rotatably secured by the connection 403 to each of the carriages 388, and the threads 401 extend through the upstanding projections 405 which are rigidly connected to the support members 390. When the lock nuts 406 are loosened and the rods 400 rotated by applying a suitable wrench to the end 407 thereof, the carriages 388 are moved back and forth with respect to the members 390 thus adjusting the relative position between the carriage 388 and the Ferris wheel 10 so that proper changes can be made in the retracted position of the carriage 388 to permit interchangeability of the drive and back plate heads 380 and 383.

A suitable pneumatic cylinder 408 is provided on each side of the machine, and their piston rods 409 are connected to the support members 390 for effecting reciprocating movement of the carriages 388 and their associated heads 380 and 383 between engaged and retracted positions with respect to the index head 15c. When the support members 390 are moved to the advanced positions the lock pins 410 (only one of which is shown in FIG. 24) are forced by the air cylinders 411 through the clamp members 397 into engagement with the notches 412 in the members 390 for locking the carriages 388 against the movement. The limit switch LS8 is actuated by the right-hand pin 410 for indicating whether the pin is engaged or disengaged, whereas the limit switches LS4 and LS5 which are operated by the rod 413 connected to the carriage 388 sense whether the carriage 388 is in its advanced or retracted position. Limit switches LS4A, LS5A and LS8A (FIGS. 31 and 33) are provided on the left-hand side of the machine for performing substantially the same function as their counterparts LS4, LS5 and LS8, respectively, on the right side of the machine.

The drive head 380 on the right-hand spin carriage 388 is secured to and rotated by the end of the drive shaft 414 (FIGS. 22 and 23) which has its left end supported for rotation in the carriage 388 by the bearings 415, while the lock nut 416 and the shoulder 417 (FIG. 22) on the drive shaft 414 prohibit relative axial movement between the shaft 414 and the spin carriage 388. The drive head 380 engages the index head 15c in substantially the same manner as the drive member 370 of the drive head 355 engages the index head 15a during the blade receiving operation.

As shown in FIG. 23, the central portion of the drive shaft 414 is supported by the bracket 420 extending upwardly from the base 391, and this shaft is splined so that the drive head 380, the spin carriage 388, and the drive shaft 414 may be shifted from right to left and without interference with the mounting bracket 420. The sleeve member 421 having the keys or splines 422 held therein for engagement with the splined shaft 414, is held in the bearing member 423 of the mounting bracket 420 by the shoulder 425 on one end and the washer 427 and nut 428 on the other end. The drive pulley 430 is then connected to the sleeve member 421 by the bolts 431, and alignment between these two members is insured by the guide pin 432. This arrangement permits the drive head 380, the spin carriage 388, and the drive shaft 414 to be reciprocated by the cylinder 408 while allowing the drive pulley 430 to transfer rotating motion to the shaft 414 without reciprocating therewith. As shown in FIGS. 3 and 21, an identical drive arrangement is provided on the left side of the spinning assembly, and the pulleys 430 are driven from the drive shaft 433 which extends across the entire width of the machine and is connected to the output shaft of motor 434 through a suitable clutch 435.

The left spin carriage 388 (FIGS. 21 and 22) has the back plate head 383 thereon which separates the back plate 23 from its guide 382 and carries it into operative relation with flanges 24 on the ends of the blades 17 on the index head 15c. The head 383 includes a body member 436 which is secured to the flanged end 437 on the innermost end of the drive shaft 414 on the left side of the machine by the through bolt 438, and the guide pins 439 are provided between these two members to insure proper alignment therebetween. It should be noted that the shaft 414 and the flanged end 437 on the left-hand side of the spinning assembly are identical to those on the right side thereof so that the heads 380 and 383 are easily interchanged.

The ring 440 is provided around the periphery of the body member 436 and has the projection 441 thereon (FIGS. 28 and 29) which corresponds to the grooves 442 formed in the back plate 23 so that when the head 383 moves through the aperture 444 in the back plate guide 382, the back plate 23 is stripped therefrom and held c the body member 436 since a certain amount of force exerted by the head 383 against the back plate 23 to di engage it from the guide 382, to be described, whic causes the projection 441 to be forced into the groove 44 in the back plate 23.

The back plate guide 382 receives the back plate 2 and guides it into alignment with the aperture 444 from where it is picked up by the head 383, as described abov The guide 382 includes a base plate 445 which is secure to the base 391 by the upstanding support members 44( and has the guide rails 447 bolted thereto along opposit edges with their inwardly projecting flanges 448 extendin substantially parallel to but spaced from the base plat 445 to provide grooves for guiding the back plate 23 int alignment with the aperture 444, which is of sufficient siz to permit movement of the head 383 therethrough (FIG 22). As shown in FIG. 26, the periphery 449 of the aper ture 444 is sloped in an axial direction to insure that th head 383 will align therewith, and the smallest interna diameter of this aperture is smaller than the outer diam eter of the back plate 23 so that it will not pass throug] the aperture 444.

The back plate 23 is held against axial movement t the right, as viewed in FIG. 26, by the latches 450 pro vided on opposite sides of the aperture 444 for engagin the outer peripheral flanges 24 of the back plate 23 The latches 450 are pivoted on the pins 451 secured in the blocks 452 which are mounted on the base plate 445, and they are urged into engagement with the bacl plate 23 by the springs 453 which are interposed between the latch 450 and bores 454 formed in the guide rail 443. The nose portions 455 of the latches 450 ar( rounded so that, when the head 383 moves through the aperture 444 and engages the back plates 23, the latche 450 will release the back plate 23. The springs 453 ar( of sufficient bias to cause the grooves 442 in the back plate 23 to be engaged by the projections 441 on the head 35: so that the back plate will be supported on the head 38: after separation from the guide 382.

On the outermost end of each drive shaft 414 opposite the heads 380 and 383, the reciprocating air cylinder: 460 (FIGS. 21–23) are provided for operating the knock out or piston rods 461 which extend co-extensively through the tubular drive shafts 414 for releasing the finishec blower wheel 25 from the index head 15c. As showr in FIG. 22, a knockout head 463 reciprocates in the bore 464 of the body member 436 and is secured on the terminal end of the knockout rod 441 for engaging the knockout screw 280 to release the finished blower wheel 23 from the head 15c, in a manner described above, by forcing the fixture 256 against the body 250 so that one of the rings 270 is released from engagement with the blades 17.

The spinner wheel mechanism 385, as shown in FIGS. 21, 22 and 27, includes the two spinning wheels 470 which deform the outer peripheral flanges 377 (FIG. 26) of the end ring 22 and back plate 23, respectively, around the upturned edge or flange 24 on each of the blades 17 to lock these members together. The spin wheels 470 are mounted on the arms 475 (FIG. 22) extending from opposite sides of the top portion of the mounting bracket 476 and have the bearings 477 secured thereon by the cap members 478 which are secured to the arm 471 by the screws 479. Each of the wheels 470 has the forming flange 480 projecting radially outwardly therefrom for engaging and deforming the outer peripheral flanges 377 of the end ring and back plate, as shown in FIGS. 28 and 29.

The bracket 476 is suitably secured to a saddle member 481 (FIG. 27) which has one end pivotally secured by the pin 482 to the blocks 484 on the base 391, and has its other end secured to the piston rod 485 of the air cylinder 487 which effects vertical pivotal movement of the saddle member 481 so that the spinner wheels 470 moved into contact with the flanges 24, and the other end of the motor 487 is secured by conventional fastening means to the base of the machine, as shown in FIG. 1.

Upward pivotal movement of the saddle member 481 is limited by the adjustable stop screw 490 which readedly engages the cross member 491 supported on either side of the saddle member 481 by the blocks 493 which are suitably secured to the base 391. The stop screws 490 effect fine adjustments in the upper limit of movement of the spin rolls 470 since their precise positioning in the raised position is critical as it determines the degree of deformation of the flanges 377 on the end ring 22 and back plate 23, and a suitable limit switch 36 (FIG. 33) is actuated when the spin wheels 470 reach their raised position. Large adjustments in the positioning of the spin rolls 470 are made by the use of a spacer block 495 placed between the bracket 476 and the saddle 481.

Sequence of automatic operation

The operation of the machine is best described in connection with the electrical and pneumatic diagram shown in FIGS. 30 to 36 and the structure shown in FIGS. 1 to 29. The electrical system can be viewed in its entirety by placing FIGS. 30 to 34 end to end with the bottom of FIG. 30 adjacent the top of FIG. 31, etc. For convenience in explanation, each conductor in the electrical schematic is designated by a single line number with most of the horizontal conductors being numbered consecutively along the left-hand edge of the figures by the numbers 510 through 577, while reference characters in the 900 series refer to the pneumatic circuits of FIG. 36. Each of the relays used in the electrical system comprises a coil which is given the relay number and one or more normally closed or normally open contacts designated by the same reference characters as the associated coil with a small letter suffixed thereto. For example, the relay R3 has the normally open contact R3a and the normally closed contacts R3c operated thereby.

For purposes of this explanation, it is assumed that the machine is set up to produce a counterclockwise blower wheel, and that the metal stock S is fed through the die 50 so that a blade 17 will be transferred to the index head 15a for each stroke of the press 16. Both automatic and manual operation of the machine are controlled from a number of selector switches on the panel P (FIG. 1), and to commence operation it is first necessary to energize the index, press, and spin motors 27, 46 and 434, respectively, each of which has a switch on panel P and may be connected through the circuit breaker 500 (FIG. 30), the fuses 501 and lines 503 to a source of power.

Thus, to initiate forward operation of the press motor 46, the normally open switch 580 in line 510 is closed manually to complete a circuit to the relay M1F between the lines 507 and 508 which are connected through the transformer 571 and the lines 583 to the power lines 503. When the relay M1F is energized, the normally open contacts M1Fa in line 511 are closed to hold in the relay M1F after the switch 580 is released. Simultaneously therewith, the normally open contacts M1Fb in lines 503 are closed to energize the motor 46, which continues to operate until the circuit to the relay M1F is opened, either by opening the on-off selector switch 501 in line 507, by manually actuating one of the normally closed switches 585 spaced at convenient locations around the machine, or by opening the normally closed stop switch 586 in line 510.

If desired during set-up, the direction of rotation of the press motor 46 can be reversed by momentarily closing the manually actuated switch 590 in line 512 thus completing a circuit to the relay M1R, provided however that the relay M1F is not energized so that the normally closed contacts M1Fc in line 512 remain in their closed position. Once this relay is energized, the normally open contacts M1Ra in line 513 are closed so that the relay M1R remains energized until this circuit is broken. When relay M1R closes, it closes the normally open contacts M1Rb in lines 591 to reverse the connections to the press motor 46, causing operation in a reverse direction, and opens the normally closed contacts M1Rc in line 510 to prohibit energization of the relay M1F while the motor 46 is running in this reverse direction. The lights 593 and 594 may be provided in parallel with the relays M1F and M1R, respectively, for the purpose of giving visual indication when the associated relay is energized.

A circuit to spin motor 434 is completed when the relay M2 in line 514 is energized by momentarily closing the normally open switch 596 and thereby closing the normally open contacts M2a in lines 600 to effect operation of the spin motor 433. A holding circuit for the relay M2 is also completed when the normally open contacts M2b in line 515 are closed to complete a circuit around the manually actuated switch 596 and maintain energization of the relay M2 until the normally closed stop switch 601 is opened manually, or until this circuit is opened in some other way.

Closing the normally open switch 603 completes a circuit through line 516 to energize the relay M3 and close the normally open contacts M3a in lines 605 to effect operation of the index motor 27. Energization of this relay is maintained through the line 517 when the normally open contacts M3b are closed by the relay M3, and operation of the motor 27 continues until its circuit is opened, for example, by depressing manually the normally closed stop switch 607 in line 516. The lights 608 and 609 may be mounted in parallel with the relays M2 and M3, respectively, for giving the operator visual indication of the status of the associated relay and motor.

Since a clockwise wheel is to be produced, the selector switch 610 in line 518 (FIG. 31) is appropriately positioned to complete a circuit to relay R17 which then operates a number of contacts to program the electrical system in an appropriate manner for the making of a clockwise blower wheel, as will be explained in detail. When it is desired to make a counterclockwise wheel the selector switch 610 is positioned to complete a circuit through line 519 and energize relay R19 which suitably programs the system, as will be seen. To effect automatic operation of the machine, the automatic-manual selector switch 615 (line 523) is moved to the automatic position, as shown in the drawings, to position its contacts 615a through 615h so that the electrical system is set for automatic operation.

In the automatic operation, the operator first places an end ring on the index head 15d where it is held by the latches 286, and he depresses the normally open switches 620 in lines 521 to effect movement of the Ferris wheel 10 so that the index head 15d is moved into the position shown by the index head 15a. That is, switches 620 are closed to energize the index clutch relay R1 providing the following conditions exist: The right and left-hand spin carriages 380 are back so that the limit switches LS5 and LS5A in line 521 are closed, the blade index drive heads 355 are back so that the limit switches LS3 and LS3A in line 521 are closed, the spin rolls 470 are down so that the limit switch LS7 is closed, the Ferris wheel 10 is in a stationary position so that the switch LS10 engages contact 521a in line 521, and the contacts R16a are closed by relay R16 in a line 526 which is energized when the press ram 53 is at the top of its stroke so that limit switch LS1 in line 526 is closed.

Thus when the above conditions exist and the switches 620 are closed by the operator, a circuit is completed in line 521 to the relay R1 which immediately closes contacts R1a in line 621 (FIG. 30) causing energization of the coil 623 to effect engagement of the clutch of the clutch-brake unit 28 so that the Ferris wheel 10 is rotated through 90° to the next position since the index motor 27 is running. The normally closed contacts R1b in line 625 leading to the coil 626 of the brake of unit 28 are opened simultaneously with the closing of the contacts R1a by the relay R1 so that the brake is released. The switches 620 need only be momentarily closed since a holding circuit which by-passes the switches LS10 and 620 is completed through lines 630 and 631 when the relay R1 closes normally open contacts R1c.

As the Ferris wheel 10 begins to rotate, the limit switch LS10 is moved to engage contact 635a of line 635 to complete a circuit through line 636 to the relay R2 which then closes the contacts R2a in line 630 thus completing a by-pass circuit around the switch LS10 to the relay R2 through the now closed contacts R1d and the line 636. When the Ferris wheel 10 has rotated 90° to the next index station, the switch LS10 is moved back into engagement with the contact 521a so that a circuit to the cycle start relay R3 in line 523 is now completed through the line 521, the line 640 having the now closed contact R2b therein, and the line 523.

Energization of the relay R3 immediately opens the normally closed contacts R3a in line 521 to terminate energization of relay R1, and thereby causing the contacts R1a to be opened to deenergize the index clutch coil 623 and disconnect the motor 27 from the Ferris wheel drive shaft 18. Simultaneously, the contacts R1b in line 625 are closed so that the brake coil 626 is energized to engage the brake of unit 28 to prohibit additional rotation of the Ferris wheel 10. A circuit to relay R3 is also maintained through line 523, the line 645 having the normally closed contacts R15a therein, and the now closed contacts M1Fd, R3b and 615a. The normally closed contacts R2d and R3f in lines 521 and 642, respectively, are provided as a safety measure to insure the proper operation of the system when the operator maintains the switches 620 in a closed position.

Energization of the relay R3 also causes the drive head 355 on the right side of the machine to be advanced into engagement with the index head 15a by closing the normally open contacts R3c in line 525 which completes a circuit to relay R4 through the limit switch LS11 which is closed when the Ferris wheel 10 is in one of its four index positions. The switch LS11 thus prohibits energization of the relay R4 when the Ferris wheel 10 is being indexed. The normally closed contacts R4a in line 548 (FIG. 33) are then closed to complete a circuit to the coil 550c through the normally open contacts R17a which have been closed by the clockwise relay R17.

Referring to FIG. 36, energization of the coil 550c causes the four-way valve 900 to be shifted downward causing air under pressure from lines 901 and source P to be connected to line 903 for pressurizing the air cylinder 347 to move right-hand index drive head 355 into driving engagement with the index head 15a on the Ferris wheel 10. If a counterclockwise wheel is being produced, the normal contacts R19a in line 548 would be closed rather than contacts R17a in line 548 so that the coil 548c would be energized to shift the valve 906 downwardly to connect the line 907 and the left-hand cylinder 347 to the pressure source P thus moving the left-hand index drive head 355 into its engaged position. When either of the index drive heads 355 is in its advanced position driving the index head 15, one of the limit switches LS3 or LS3A in line 521 is opened so that the index clutch relay R1 cannot be engaged to rotate the Ferris wheel 10.

Operation of the press 16 is started automatically when the drive head 355 moves into engagement with the index head 15a since the limit switch LS2A in line 530 (FIG. 32) is moved to the closed position wherein a circuit is completed to the relay R8 in the line 650 through the lines 525, 652 and 530 having the now closed contacts R17b therein, line 654, the now closed contacts 615e and R3d in line 655, the line 656, the line 657 having the now closed contacts R17c therein, and the limit switch LS9A which engages the contact 650b when the arm 375 on the drive head 355 is in the vertical starting position which exists prior to the time the press 16 is started. Energization of the relay R8 is then maintained through the line 656 and 661, the latter having the normally open contact R8a therein.

When a counterclockwise wheel is produced, the circuit to the relay R8 is completed through the lines 6, 527, 654, and 655, the normally closed contacts R17d and the limit switch LS9 which is in engagement with contact 650a when the arm 375 on the drive head 355 in its vertical starting position. The bulb 658 in line 5 is lighted when the arm 375 is in the vertical position since switch LS9A engages the contacts 660a in line 6 and completes a circuit through the line 659 having the now closed contacts R17e therein and the line 660. Similarly, when a counterclockwise wheel is being produced this circuit is completed in line 535 through the normally closed contact R17f and the switch LS9 which engages the contact 535a.

The relay R8 also closes the normally open contacts R8b in line 664 to complete a circuit to the press clutch coil 666 and the relay R5 through the normally closed contacts R7a in the line 668 thus causing the valve 9 (FIG. 36) to be shifted upwardly as viewed in FIG. to connect the source of pressure P to the air motor 9 which effects engagement of the press clutch 48 to start operation of the press 16. Each stroke of the press produces an individual blower wheel blade 17 and transfers it to the index head 15a which is being driven by the drive head 355 in correlation with the press operation as described hereinbefore. As the index head 15a begins to rotate, the limit switch LS9A in line 657 is actuated the arm 375 and moved into engagement with the contact 670b in line 670 to complete a circuit to the relay R6 line 672. A holding circuit is completed immediately the relay R6 through the line 656, the line 676 having the normally open contact R6a therein, and the line 67

When the index head 15a completes one complete revolution so that it is entirely filled with the individual blower wheel blades 17, the lever 375 again reaches i vertical position to actuate the limit switch LS9A an terminate operation of the press 16. In detail, the switch LS9A is moved back into engagement with the contact 650b to complete a circuit to switch LS1 in line 68 through line 650 and the line 680 having the now close contacts R6b and R8c therein. When the press stroke reaches its uppermost limit, the switch LS1 is moved into engagement with the contact 681a, and a circuit is completed to the relay R7 through the line 681 having th normally open contacts R6f therein. The contacts R7 in line 668 are then immediately opened thus terminating energization of the relay R5 and the clutch coil 666 s that the spring 917 (FIG. 36) shifts the valve 915 to it alternate position wherein the clutch motor 916 is vented and the press clutch disengaged so that the press 16 i stopped with its ram 53 at the top dead center position.

The relay R7 also closes the normally open contact R7 in line 551 (FIG. 34) to complete a circuit through th now closed contacts R17g in line 552 to the coil 552c i line 551 to cause the clockwise index head 335 to b retracted. Thus the valve 900 is shifted upwardly as viewed in FIG. 36 to connect the line 901 and the pres sure source P to the line 920 causing the right-hand ai cylinder 347 to retract the clockwise drive head 355 When a counterclockwise wheel is being produced, the electrical circuit would be completed through the line 551 and the normally open contacts R19b therein, to energize the coil 551c and retract the counterclockwise index drive head 355 by shifting the valve 906. The relay R7 also closes the contacts R7c in line 531 to maintain power in the line 654 when the drive head 355 is retracted and the limit switches LS2 or LS2A opened as a result thereof.

Simultaneously with the forming of the individual blades 17 by the die 50, and their insertion into the index head 15a, the end ring 22 and back plate 23 are being spun onto the blades 17 mounted on another index head which has been positioned at the spinning station by Ferris wheel 10. The spinning operation starts when [b]ack plate 23 has been inserted into the guide 382 and [p]roperly positioned with respect to the aperture 444 that the relay R9 is energized by completion of a cir[cui]t from line 536, through the transformer 700, the line [?], and the contacts 705 and 706 which are electrically [con]nected by the back plate 23 when it is properly posi[tion]ed. The relay R9 then closes the contacts R9a in line [?] to complete a circuit to the light bulb 708 thus giving [visu]al indication that the back plate 23 is properly posi[tion]ed.

The relay R9 also closes the normally open contacts [R9]b in line 538 to complete a circuit to the relay R10 [thr]ough the line 656, the closed contacts 615f of switch [?]5, and the lines 710 and 538. The relay R10 then [clo]ses the normally open contacts R10a and R10b in lines [?] and 555, respectively, to complete a circuit from the [lin]e 710 to the coils 553c and 555c thus actuating the [val]ves 925 and 926, respectively, and causing the right [and] left-hand spin head cylinders 408 to move the car[ria]ges 388 and their respective heads 380 and 383 into [eng]agement with the index head 15c. When relay R10 [is] actuated, the normally closed contacts R10c and R10d [in] lines 572 and 574, respectively, are opened thus pre[ve]nting energization of the mechanism for moving the [spi]n carriages to their retracted positions.

It is preferable that the drive head 380 engage the in[de]x head 15c and lock it against rotation before the [ba]ck plate head 383 moves the back plate 23 into engage[me]nt with the ends of the blades 17 on the index head [15]c. Accordingly, the coil 577c in line 577 is energized [thr]ough the now closed contacts R17h for actuating the [tw]o-way valve 930 so that the line 931 will be blocked [thu]s limiting the flow to the left-hand cylinder 408 [th]rough the line 933.

At the same time the coil 576c in line 576 is not ener[giz]ed, since the normally closed contacts R17i have been [op]ened by the relay R17 and the valve 935 does not block [th]e line 936 so that the source of pressure P is connected [to] the right-hand cylinder 408 through both the lines 936 [an]d 938 and thus the right-hand cylinder 408 moves for[wa]rd at a faster rate and, as a result, positions the drive [he]ad 380 in operative engagement with the index head [1]5c in advance of the back plate head 383. When a [co]unterclockwise blower is being produced, the valve 935 [is] actuated whereas the valve 930 remains in the open [po]sition so that the left-hand carriage 388 is advanced [at] a faster rate than the right-hand carriage.

After the drive head 380 engages the index head 15c, [th]e back plate head 383 is moved through the aperture [4]44 in the guide 445 to pick up the back plate 23 in the [m]anner described hereinbefore. The head 383 continues [it]s movement to the right, as viewed in FIG. 22, until the [ba]ck plate 23 engages the blades 17 and forces them [lo]ngitudinally into contact with the end ring 22 (FIG. 28) [so] that the final relative positions between the blades 17, [th]e end ring 22 and the back plate 23 are established.

When the carriages 388 with the associated heads 380 [an]d 383 reach their advanced or forward positions, the [s]witches LS4 and LS4a in line 542 (FIG. 33) are closed [to] actuate the relay R11 which in turn closes the con[ta]cts R11a in line 560 to energize the coil 560c. The [co]il 560c shifts the valve 940 upwardly, as viewed in [F]IG. 36, to allow pressurized air to enter the air cylinders [4]11 and extend the lock pins 410 to secure the carriages [3]88 in their advanced positions so that the blower wheel [c]omponents are locked against relative axial movement in [th]e position shown in FIG. 22.

When the lock pins 388 are extended, the limit switches [L]S8 and LS8A in line 543 are closed to complete a cir[c]uit to and energize the spin clutch and time delay relays [R]12 and TDR1. The spin clutch relay R12 immediately [c]loses the contacts R12a in line 562 to complete a circuit [th]rough the normally open contacts M2c, which are [c]losed when the spin motor 433 is running, to the coil 562c which shifts the valve 945 thus pressurizing the cylinder 946 to effect engagement of the spin clutch 435. The rotary movement of the spin motor 434 is thereby connected to the drive shafts 414 so that the drive and back plate heads 380 and 383 rotate the index head 15c at a relatively high rate of speed.

The time relay TDR1 delays a predetermined amount of time so that the index head 15c can be brought up to speed and then it closes the contacts TDR1a in line 563 completing a circuit to the coil 563c which shifts the valve 950 to the right, as viewed in FIG. 36, causing the pressurized fluid to be supplied to the spin cylinder 487 to raise the spin rolls 470 with respect to the index head 15c. As the spin rolls 470 move upwardly (see FIGS. 28 and 29) they deform the outer peripheral flanges 377 of the end ring 22 and back plate 23, respectively, around the upturned flanges 24 on the ends of the individual blades 17 to complete a blower wheel 25.

When the rolls 470 reach the uppermost limit of their travel so that the deformation of the flanges 377 is completed, the limit switch LS6 in line 544 is actuated to complete a circuit to the relays R13, R14, and TDR2. The normally closed contacts R13a in line 545 are immediately closed by the relay R13 to maintain a circuit to the relays R13, R14 and TDR2 after the spin rolls 470 commence movement to their retracted positions. The relay R13 also opens the normally closed contacts R13b in line 538 and breaks the circuit to the relay R10 thus deenergizing the coils 553c and 555c to shift the valves 925 and 926 back to the neutral position. The relay R13 opens the normally closed contacts R13c to deenergize the relay R11 to open the circuit in line 560 to the coil 560c causing the valve 940 to be returned to the position shown in FIG. 36 wherein the springs 946 retract the lock pins 410.

In addition, the relay R13 opens the contacts R13d in line 543 to deenergize the relays R12 and TDR1 which cause the contacts R12a in line 562 to open and deenergize the coil 562c which causes the valve 945 to be shifted to the vent position wherein the cylinder 946 is connected to the atmosphere so that the spring 947 effects the disengagement of the spin clutch 435. The contacts TDR1a in line 563 are also opened causing deenergization of the coil 563c and return of the valve 950 to its central position, and simultaneously the contacts R13e in line 565 are closed to supply current to the coil 565c which shifts the valve 950 to the right, as viewed in FIG. 36, causing the cylinder 487 to retract the spin rolls 470 to their lowered or inactive position.

The relay R14, which was actuated simultaneously with the relay R13, closes the normally open contacts R14a in line 570 to complete a circuit to the coil 571c through lines 570 and 571 having the normally open contacts R17j therein. The coil 571c then shifts the valve 960 downwardly causing the clockwise knockout cylinder 460 to be pressurized thereby shifting the rod 461 axially within the drive shaft 414 to engage the knockout screw 280 of the index head 15c. This action shifts the fixture 256 and rings 270 to the right to disengage one of the rings 270 from blades of the finished blower wheel so that the latter is substantially released from the index head 15c, as described above. If counterclockwise wheel were being manufactured, the counterclockwise knockout cylinder 460 would be actuated by the coil 570c in line 570 and the valve 961 since the contacts R17j and R17k in lines 511 and 570 would remain in their normally opened and closed positions, respectively.

After a predetermined amount of time elapses, the time delay relay TDR2 is energized to close the contacts TDR2a in line 547 thus completing a circuit to the relay R15. A holding circuit to the relay R15 is completed immediately in line 546 by the closing of the contacts R15a to give assurance that the relay R15 will remain energized until power is cut off from line 710. The relay R15 also closes the normally open contacts R15b in line 541 to actuate the relay R10A which is "latched" to the relay R10 and therefore moves the contacts R10a–d to their alternate positions. Thus a circuit is completed to the coils 572c and 574c in lines 572 and 574 by closing the open contacts R10c and R10d, respectively. These coils then shift the valves 925 and 926 downwardly, as viewed in FIG. 36, to connect the source of pressurized fluid to the air lines 955 and 956 causing the cylinders 408 to move the right and left-hand spin carriages 488 to their retracted positions. The normally closed contacts R10c and R10d are placed in lines 572 and 574, respectively, for blocking energization of the coils 572c and 574c during the period when the coils 553c and 555c are energized so that the spin carriages 388 are being moved to their advanced positions.

Referring again to FIG. 31, the circuit to relay R3 will be opened once each of the index drive heads 355 and the spin carriages 488 reach their retracted position since the normally closed contacts LS3, LS3A, LS5 and LS5A in line 523 will be opened. That is, the circuit to relay R3 through line 645 is open since the relay R15 opens the normally closed contacts R15c in line 645 and the circuit through the line 523 is opened between the points 523a and 523b when each of the switches LS3, LS3A, LS5, and LS5A therein is opened by the positioning of the heads 355 and carriages 388 in their retracted positions. When the relay R3 is deenergized, the contacts R3d in line 655 are opened so that the remaining relays of the automatic system are also deenergized and the system returned to its starting position once again. Thus the operator removes the finished blower wheel from and places an end ring on the index head 15d at the operator station and then depresses the switches 620 in line 521 to start another automatic cycle.

While the above description has traced the production of a single blower wheel, it should be apparent that four blower wheels are simultaneously in various stages of production. The operator is required to perform only four unskilled operations during the production of each blower, that is, he must place the end ring 22 on the index head 15d, place a back plate 23 in the guide 382, depress the switches 620, and remove the finished blower wheel 25. However, one or all of these operations may be performed mechanically without departing from the scope of the invention.

If at any time during automatic operation of the system one of the emergency switches 585 in line 507 (FIG. 30) is depressed, or for any reason power is cut off, the various machine operations will be immediately stopped since the power will be cut off from the lines 507 and 508 and the various relays which control operation. After this occurs, and the trouble eliminated, the motors 27, 46, and 434 are again started and the reset switch 750 having contacts in lines 522 and 661 (FIG. 35) is depressed to restart the automatic operation at the precise point of termination.

Thus assuming the operation had been stopped during the indexing of the Ferris wheel 10, depressing of the switch 750 will again complete the circuit to the relay R1 through the line 521, the switch LS10 which is in engagement with the contact 635a, the lines 635, 755 and 756. The relay R2 will be reenergized in the usual manner through the line 535 and 536 in this specific situation, and the normally closed contacts R2c in line 760 will be open so that the reset circuitry cannot energize relay R3 at this particular time. Thereafter the system will continue to operate in the usual manner as described above.

Assuming now that the automatic operation was terminated during the blade manufacturing and spinning operations, it would be first necessary to reset relay R3 by depressing the switch 750 to complete a circuit through the lines 522, 760 and 523 to the relay R3. Since this reset switch 750 is closed only momentarily, the circuit to the relay R3 is maintained through the line 523 in the manner described above when the contacts R3b there are closed.

After the relay R3 is reset, the switch 750 in line 6( is depressed to complete a circuit around the relay co tacts R8a to energize the relay R8 through the lines 65 655, 656, 661 and 650. The relay contacts R8b in li 664 and R8c in line 680 are then closed to return tl relays R5, R6 and R7, as well as the press clutch 6( to the status existing prior to the emergency stop. R closing of the contacts R3d in line 655 also suppli power to the lines 656 and 710 to restart the vario spinning operations.

When the operations at the spinning station have pr gressed beyond the insertion of the lock pins 410 at tl time the emergency stop is made, the pins 410 will l retracted since both the valve 940 and the lock pi 410 are spring returned. When the system is reset, tl spinning operation proceeds to reinsert the pins and pe form the subsequent spinning operation. Necessari then, some of the spinning operation will be repeated. should now be apparent that the reset switch 750 wi reset the entire electrical system regardless of the ope ations being performed prior to the emergency stop.

*Manual operation*

By shifting the selector switch 615 (line 523) from th automatic position to its alternate or manual position, th electrical circuitry is automatically programmed fc manual operation for use as required and primarily du: ing set-up of the machines. Manual control of the pres is attained by controlling energization of the clutch co 666 by the three-position selector switch 740 (FIG. 32 and, either the push button switch 741 on the contrc panel P, or a similar switch 742 on the rear of the mε chine. The two-position selector switch 745 determine which of the switches 741 or 742 will initiate operatio of the manual operation, and for purposes of this ex planation it will be assumed that it is positioned as show: in FIG. 32 wherein the switch 742 is in control.

The three positions of switch 740 are shown in FIG 35, and include an "inch" position wherein the pres will move a short distance each time the switch 742 i depressed, a "top stop" position which causes the ram o the press 16 to stop at its top dead center each time th switch 742 is depressed, and a "once" position whicl causes the press to run through one complete strok( starting and ending at the top dead center of the pres stroke.

Specifically, when the selector switch 740 is in th( "inch" position, a circuit is complete to the relay R5 anc press clutch coil 666 through the lines 525, 652, 527 anc 530, and the contact 615c of the selector switch 615 Since the switch 742 remains closed only momentarilɣ this circuit opens immediately so that the coil 666 anc the press clutch 48 are engaged only for a short perioc of time so that the ram 53 of the press 16 advances onlɣ a short distance.

When the switch 740 is moved to the "top stop" position and the switch 742 depressed, a circuit is completed to the clutch coil 666 through the contact 740a, line 750, contact 740c, and lines 751 and 668. The line 751 has the normally closed contacts R8d therein which eliminate the possibility of manual control of the press clutch 48 when the automatic system has energized the relay R8. The press now begins to run until this circuit is broken by the opening of the normally closed contacts R16c in line 751, which occurs when the press ram 53 reaches its top dead center position, causing the switch LS1 in line 526 to be closed and the relay R16 to be energized. The relay R16 cannot be energized during the automatic operation when the relay R8 is energized and has opened the normally closed contacts R8e in line 526.

In the "once" position of the selector switch 750, with the press ram 53 at the top of its stroke, the closing of the switch 742 completes a circuit to the clutch coil 666 and y R5 through the lines 527 and 755, contacts 740b, 756, switch LS1 which engages contact 681a when press ram is at the top of its stroke, and the lines 759 668. This circuit to the press clutch 666 is maintained subsequently through the lines 760, 762, and 664 as a result of the closing of the normally open contacts 1 in line 762 by the relay R5.

Operation of the press 16 immediately shifts the switch 1 into engagement with the contact 670a to energize y R6 through lines 670 and 672, and this circuit is maintained through the lines 760 and 766, the now sed contacts R5b and R6d. The normally closed contacts R6e in line 759 are simultaneously opened by relay so that current can be supplied to line 668 only ough the line 664. When the press ram 53 reaches top of its next stroke, the switch LS1 is moved back o contact with the contact 681a to complete a circuit the relay R7 in line 681 having the now closed switch f therein. The relay R7 immediately opens the nor-lly closed switch R7a in line 668 to break the circuit the relay R5 and the clutch coil 666 to terminate operon of the press 16 with its ram 53 at the top of its oke. The normally open contact R7f in line 765 is provided to insure proper operation of the system when : operator holds the switch 740 or 742 in the depressed closed position.

If the selector switch 740 is shifted downwardly from position shown in FIG. 32, it will program the circuitry for control by the switch 741 rather than switch 2. The switch 741 has contacts in parallel with the nilar contacts of switch 742 and thus function in a bstantially identical manner.

The clockwise and counterclockwise index heads 355 n also be moved manually by appropriately positioning the selector switch 770 having contacts in lines 550 d 552. Hence when it is desired to move one of the dex drive heads 355 forward, the switch 770 is moved that the contacts 770a will complete a circuit to the il 548c or 550c depending on the status of the relays 17 and R19 as determined by the type of blower wheel ing made. The normally closed relay contacts R4b e provided in line 550 to prohibit completion of a circuit lit therethrough during automatic operation.

In a similar manner the switch 770 can be moved to ; alternate position to close the contacts 770b in line 52 to actuate one of the coils 551c or 552c depending ain on the status of the relays R17 and R19. The norally closed contacts R7c are provided in line 552 to :ohibit completion of the automatic system. Likewise, le selector switches 775, 776 and 778 are provided in nes 554, 556, and 561, respectively, to move the left ad right spin carriages 388 forward, and the lock pins 10 into their locking positions. The normally closed lay contacts R11b in line 561 make actuation of the lector switch 778 ineffective when the relay R11 is energized during automatic operation of the system.

The selector switch 780 having contacts 780a and 780b 1 lines 564 and 567, respectively, is movable between lternate positions to effect upward movement of the spin oll 470. The lines 564 and 567 have the normally closed ontacts TDR1b and R13f therein to prohibit manual nergization of the coils 563c and 565c when the autoiatic system is in control. Similarly, the selector switches 83, 784, and 785 in lines 571, 572, and 574 operate he knockout mechanism, and move the right and left-and carriages 388 back, respectively. These lines have he normally closed relay contacts R14c, R15d, and R15e, espectively, for preventing manual operation when the ystem is being operated automatically.

During the manual operation of the machine, it is also ossible to actuate the spinning mechanism in the autoiatic mode, as described above. For this purpose the elector switch 795 in line 538 is provided so that a cir-:uit will be completed from the line 652 through the :ontacts 615g and 615h of the automatic-manual selector switch 615 to the line 710. Thus when switch 795 is closed, power is supplied to the relays R10 through R15, TDR1 and TDR2 so that each step of the spinning operation is performed in the manner described above in connection with the automatic operation starting with the energization of the relay R9 and ending with the energization of the relay R15 and the operation effected thereby. Thus, the relay R10 in line 538 is actuated when the contacts R9b are closed, and from this point on the automatic spinning operation is effected. The manual selector switches 775, 776, 780, 784, and 785 must, of course, be in their automatic position in order to operate the system in this manner.

To summarize the operations required to change the machine from the production of clockwise to counterclockwise blower wheels, it is necessary to reverse the Ferris wheel 10 so that the index heads 15 are on the right side thereof, and to reverse the drive and back plate heads 380 and 383 on the spin carriages 388. The carriages 388 must have their relative positions with respect to the support members 390 appropriately adjusted to accommodate cooperation between the associated head 380 or 383 and the index head 15c as described. Likewise, the position of the back plate guide 382 must be moved so that it cooperates with the head 383, and the selector switch 610 in line 518 must be appropriately positioned so that the electrical and pneumatic systems will be suitably programmed. It should be apparent that the change-over time will be held to a minimum when changing from the production of clockwise to counterclockwise blower wheels, and vice versa.

While a pneumatic control system is shown and described in the preferred embodiment, it is within the scope of this invention to use a liquid in place of air and to substitute the numerous equivalents for each of the elements in this system. Similarly, the electrical circuitry can be modified by substitution of equivalents so long as the above described requisite functions are substantially maintained.

While the method herein described, the forms of apparatus for carrying this method into effect, and the product or article produced by the aforesaid method and apparatus, constitute preferred embodiments of the invention, it is to be understood that the invention is not limited to this precise method and form of apparatus, and that changes may be made in either without departing from the scope of the invention which is defined in the appended claims.

What is claimed is:

1. Die apparatus for manufacturing individual blower wheel blades from sheet metal stock, comprising upper and lower die shoe means which are movable to and from engagement with each other, means on said shoes for cutting notches in each lateral edge of the stock, guide pins for engaging said notches for controlling the movement of said stock, complementary die means on said shoe means for bending each lateral edge of the stock upwardly to a position substantially perpendicular to the plane of the stock, piercing means on said shoe means for cutting a slot inwardly of each edge of the stock to define the lateral extremities of the blade surfaces except for a connecting portion between the lateral edges and the blade surface, cutter means on said shoe means for severing the metal stock transversely thereacross between the forward portions of two of the slots to define the trailing edge of one blade surface and the leading edge of the adjacent blade surface, deforming means on said shoe means for producing the smoothly curved surface on the blade surface and a slanted shoulder on the connecting portion so that the trailing edge of the blade surface projects above the plane of the metal stock, and punch means on said shoe means for severing the blade in the area of the edges from the metal stock.

2. Apparatus of the character described for manufacturing blower wheel blades from sheet metal stock, comprising complementary die means for bending each lateral edge of the stock upwardly to a position substantially perpendicular to the plane of the stock, piercing means for cutting a slot inwardly of each edge of the stock to define the lateral extremities of the blade surfaces except for a connecting portion between the lateral edges and the blade surface, cutter means for severing the metal stock transversely thereacross between the forward portions of two of the slots to define the trailing edge of one blade surface and the leading edge of the adjacent blade surface, deforming means for producing the smoothly curved surface on the blade surface and a slanted shoulder on the connecting portion so that the trailing edge of the blade surface projects above the plane of the metal stock, and punch means for severing the blade in the area of the edges from the metal stock.

3. Die apparatus for manufacturing individual blower wheel blades from sheet metal stock comprising, upper and lower die shoe means which are movable to and from engagement with each other, means on said shoe means for cutting notches at preset intervals in the stock, guide pins for engaging said notches for controlling the movement and positioning of said stock, complementary die means on said shoe means for bending each lateral edge of the stock to a position substantially perpendicular to the plane of the stock, piercing means on said shoe means for cutting a slot inwardly of each edge of the stock to define the lateral extremities of the blade surfaces, said slot having a connecting portion disposed therebetween, cutter means on said shoe means for severing the metal stock transversely across its length between the forward portions of two of the slots to define the one edge of one blade surface and another edge of the adjacent blade surface, deforming means on said shoe means for producing the smoothly curved surface on the blade surface and a slanted shoulder on the connecting portion so that the one edge of the blade surface projects above the plane of the metal stock, and punch means on said shoe means for severing the blade in the area of the edges from the metal stock.

4. Die apparatus for manufacturing a strip of blower wheel blades from sheet metal stock comprising, upper and lower die shoe means which are movable to and from engagement with each other, means on said shoe means for cutting notches at preset intervals in the stock, guide pins for engaging said notches for controlling the movement and positioning of said stock, complementary die means on said shoe means for bending each lateral edge of the stock to a position substantially perpendicular to the plane of the stock, piercing means on said shoe means for cutting a slot inwardly of each edge of the stock to define the lateral extremities of the blade surfaces, said slot having a connecting portion disposed therebetween, cutter means on said shoe means for severing the metal stock transversely across its length between the forward portions of two of the slots to define the one edge of one blade surface and another edge of the adjacent blade surface, and deforming means on said shoe means for producing the smoothly curved surface on the blade surface and a slanted shoulder on the connecting portion so that the one edge of the blade surface projects above the plane of the metal stock.

5. Die apparatus for manufacturing individual blower wheel blades from sheet metal stock, comprising upper and lower die shoe means which are movable to and from engagement with each other, means on said shoe means for cutting notches at preset intervals in the stock, guide pins for engaging said notches for controlling the movement and positioning of said stock, complementary die means on said shoe means for bending each lateral edge of the stock to a position substantially perpendicular to the plane of the stock, piercing means on said shoe means for cutting a slot inwardly of each edge of the stock to define the lateral extremities of the blade surfaces, said slot having a connecting portion disposed therebetween, cutter means on said shoe means for severing the metal stock transversely across its length between the forward portions of two of the slots to define the one edge of one blade surface and another edge of the adjacent blade surface, deforming means on said shoe means for producing the smoothly curved surface on the blade surface and punch means on said shoe means for severing the blade in the area of the edges from the metal stock.

6. Apparatus of the character described for manufacturing blower wheel blades from sheet metal stock, comprising frame means, complementary die means on said frame means for bending each lateral edge of the stock upwardly to a position substantially perpendicular to the plane of the stock, piercing means on said frame means for cutting a slot inwardly of each edge of the stock to define the lateral extremities of the blade surfaces except for connecting portion between the lateral edges and the blade surface, cutter means on said frame means for severing the metal stock transversely thereacross between the forward portions of two of the slots to define one edge of one blade surface and an edge of the adjacent blade surface, deforming means on said frame means for producing the smoothly curved surface on the blade surface and a slanted shoulder on the connecting portion so that the one edge of the blade surface projects above the plane of the metal stock, and punch means on said frame means for severing the blade in the area of the edges from the metal stock.

No references cited.

RICHARD H. EANES, JR., *Primary Examiner.*